(12) United States Patent
Lynam et al.

(10) Patent No.: US 7,880,596 B2
(45) Date of Patent: *Feb. 1, 2011

(54) VEHICLE EXTERIOR REARVIEW MIRROR SYSTEM WITH BLIND SPOT INDICATOR

(75) Inventors: Niall R. Lynam, Holland, MI (US); James A. Ruse, Allegan, MI (US); Craig Kendall, Grand Haven, MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 12/794,111

(22) Filed: Jun. 4, 2010

(65) Prior Publication Data

US 2010/0238014 A1 Sep. 23, 2010

Related U.S. Application Data

(63) Continuation of application No. 12/370,050, filed on Feb. 12, 2009, now Pat. No. 7,760,111, which is a continuation of application No. 11/994,471, filed as application No. PCT/US2006/026148 on Jul. 5, 2006, now Pat. No. 7,492,281.

(60) Provisional application No. 60/696,953, filed on Jul. 6, 2005, provisional application No. 60/784,570, filed on Mar. 22, 2006.

(51) Int. Cl.
*G08G 1/00* (2006.01)
*G08G 1/16* (2006.01)
(52) U.S. Cl. .................. 340/435; 701/301; 340/904
(58) Field of Classification Search ............ 340/904, 340/461, 462, 435, 815.4; 701/301, 96; 359/843, 359/844, 871–877, 865
See application file for complete search history.

(56) References Cited

U.S. PATENT DOCUMENTS 2,010,138 A 8/1935 Condon (Continued)

FOREIGN PATENT DOCUMENTS

CA 1063695 10/1979

(Continued)

OTHER PUBLICATIONS

Search Report and Written Opinion for corresponding PCT Application No. PCT/US2006/026148, filed on Jul. 5, 2006.

(Continued)

*Primary Examiner*—Benjamin C Lee
*Assistant Examiner*—Sigmund Tang
(74) *Attorney, Agent, or Firm*—Van Dyke, Gardner, Linn & Burkhart, LLP

(57) ABSTRACT

An exterior rearview mirror system for a vehicle includes an exterior rearview mirror assembly that is mountable at an exterior side of a vehicle and has an inboard portion that is viewable by a driver of the vehicle when the mirror assembly is mounted at the exterior side of the vehicle. A blind spot indicator is disposed at the inboard portion of the mirror casing of the mirror assembly. The blind spot indicator comprises at least one illumination source for indicating to the driver a detected presence of an object alongside of and/or rearward of the vehicle. The indicator may comprise a unitary indicator module that is mountable at the inboard portion of the mirror assembly. The indicator module may include an illumination source and circuitry and may be connectable to an electrical connector.

31 Claims, 32 Drawing Sheets

U.S. PATENT DOCUMENTS

| | | | |
|---|---|---|---|
| 2,263,382 A | 11/1941 | Gotzinger | |
| 2,580,014 A | 12/1951 | Gazda | |
| 3,266,016 A | 8/1966 | Maruyama et al. | |
| 4,499,451 A | 2/1985 | Suzuki et al. | |
| 4,588,267 A | 5/1986 | Pastore | |
| 4,623,222 A | 11/1986 | Itoh et al. | |
| 4,630,904 A | 12/1986 | Pastore | |
| 4,721,364 A | 1/1988 | Itoh et al. | |
| 4,793,690 A | 12/1988 | Gahan et al. | |
| 4,799,768 A | 1/1989 | Gahan | |
| 4,812,814 A | 3/1989 | Elliott | |
| 4,906,085 A | 3/1990 | Sugihara et al. | |
| 4,917,477 A | 4/1990 | Bechtel et al. | |
| 4,951,179 A | 8/1990 | Machida | |
| 5,014,167 A | 5/1991 | Roberts | |
| 5,189,537 A | 2/1993 | O'Farrell | |
| 5,207,492 A | 5/1993 | Roberts | |
| 5,313,335 A | 5/1994 | Gray et al. | |
| 5,340,503 A | 8/1994 | Varaprasad et al. | |
| 5,355,284 A | 10/1994 | Roberts | |
| 5,371,659 A | 12/1994 | Pastrick et al. | |
| 5,436,741 A | 7/1995 | Crandall | |
| 5,438,487 A | 8/1995 | Schmid et al. | |
| 5,481,409 A | 1/1996 | Roberts | |
| 5,497,306 A | 3/1996 | Pastrick | |
| 5,528,422 A | 6/1996 | Roberts | |
| 5,535,056 A | 7/1996 | Caskey et al. | |
| 5,566,028 A * | 10/1996 | Wodeslavsky | 359/871 |
| 5,575,552 A | 11/1996 | Faloon et al. | |
| 5,587,699 A | 12/1996 | Faloon et al. | |
| 5,669,699 A | 9/1997 | Pastrick et al. | |
| 5,724,187 A | 3/1998 | Varaprasad et al. | |
| 5,751,489 A | 5/1998 | Caskey et al. | |
| 5,786,772 A | 7/1998 | Schofield et al. | |
| 5,788,357 A | 8/1998 | Muth et al. | |
| 5,823,654 A | 10/1998 | Pastrick et al. | |
| 5,886,838 A * | 3/1999 | Kuramoto | 359/841 |
| 5,929,786 A | 7/1999 | Schofield et al. | |
| 5,938,320 A | 8/1999 | Crandall | |
| 6,005,724 A | 12/1999 | Todd | |
| 6,045,243 A | 4/2000 | Muth et al. | |
| 6,065,840 A | 5/2000 | Caskey et al. | |
| 6,111,683 A | 8/2000 | Cammenga et al. | |
| 6,175,300 B1 | 1/2001 | Kendrick | |
| 6,176,602 B1 | 1/2001 | Pastrick et al. | |
| 6,193,380 B1 * | 2/2001 | Jacobs | 359/843 |
| 6,196,688 B1 | 3/2001 | Caskey et al. | |
| 6,198,409 B1 | 3/2001 | Schofield et al. | |
| 6,227,689 B1 | 5/2001 | Miller | |
| 6,243,218 B1 | 6/2001 | Whitehead | |
| 6,257,746 B1 | 7/2001 | Todd et al. | |
| 6,276,821 B1 | 8/2001 | Pastrick et al. | |
| 6,286,965 B1 | 9/2001 | Caskey et al. | |
| 6,310,738 B1 | 10/2001 | Chu | |
| 6,326,900 B2 * | 12/2001 | DeLine et al. | 340/815.4 |
| 6,356,376 B1 | 3/2002 | Tonar et al. | |
| 6,363,326 B1 * | 3/2002 | Scully | 701/301 |
| 6,447,130 B2 | 9/2002 | Chu | |
| 6,467,920 B2 | 10/2002 | Schnell et al. | |
| 6,512,624 B2 | 1/2003 | Tonar et al. | |
| 6,582,109 B2 | 6/2003 | Miller | |
| 6,598,982 B2 | 7/2003 | Witt | |
| 6,612,708 B2 | 9/2003 | Chu | |
| 6,616,314 B2 | 9/2003 | Thau | |
| 6,648,477 B2 | 11/2003 | Hutzel et al. | |
| 6,648,488 B1 * | 11/2003 | Pearce | 362/96 |
| 6,669,267 B1 | 12/2003 | Lynam et al. | |
| 6,690,268 B2 | 2/2004 | Schofield et al. | |
| 6,700,692 B2 | 3/2004 | Tonar et al. | |
| 6,755,544 B2 | 6/2004 | Schnell et al. | |
| 6,855,431 B2 | 2/2005 | Varaprasad et al. | |
| 6,882,287 B2 | 4/2005 | Schofield | |
| 6,902,284 B2 | 6/2005 | Hutzel et al. | |
| 7,038,577 B2 | 5/2006 | Pawlicki et al. | |
| 7,184,190 B2 | 2/2007 | McCabe et al. | |
| 7,195,381 B2 | 3/2007 | Lynam et al. | |
| 7,255,451 B2 | 8/2007 | McCabe et al. | |
| 7,492,281 B2 * | 2/2009 | Lynam et al. | 340/904 |
| 7,760,111 B2 * | 7/2010 | Lynam et al. | 340/904 |
| 2004/0090689 A1 * | 5/2004 | Yamabe | 359/865 |
| 2006/0056086 A1 * | 3/2006 | Hannah | 359/843 |
| 2006/0061008 A1 | 3/2006 | Karner et al. | |
| 2006/0181772 A1 | 8/2006 | Byers et al. | |
| 2006/0184297 A1 | 8/2006 | Higgins-Luthman | |
| 2007/0058257 A1 | 3/2007 | Lynam | |

FOREIGN PATENT DOCUMENTS

| | | |
|---|---|---|
| EP | 0443185 | 8/1991 |
| GB | 1172382 | 11/1969 |
| WO | WO-2006/017019 | 2/2006 |
| WO | WO-2006/124682 | 11/2006 |

OTHER PUBLICATIONS

Examination Report for European patent application 06786337.3 dated Jan. 12, 2010.

Extended Report for European patent application 06786337.3 dated Oct. 5, 2009.

* cited by examiner

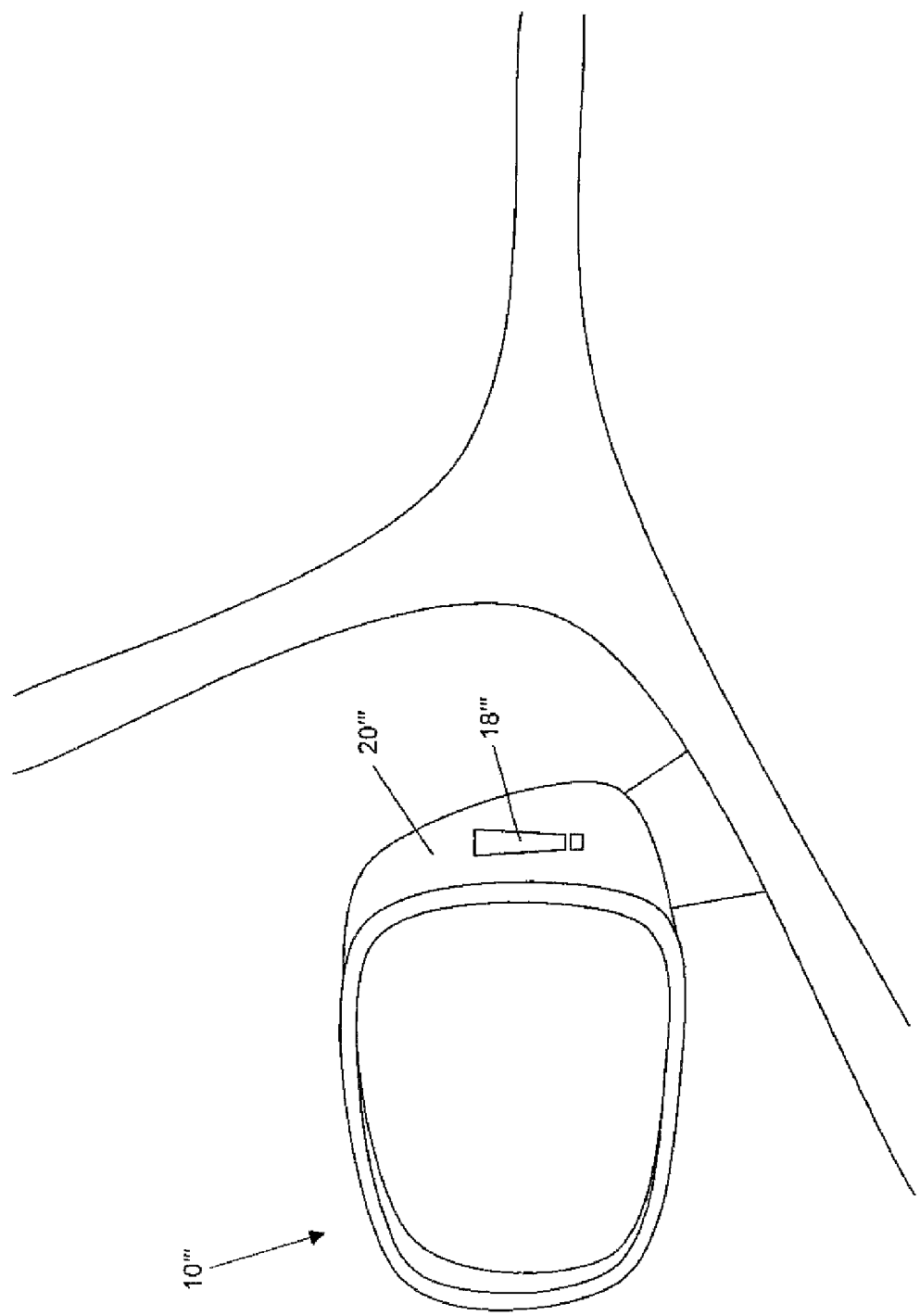

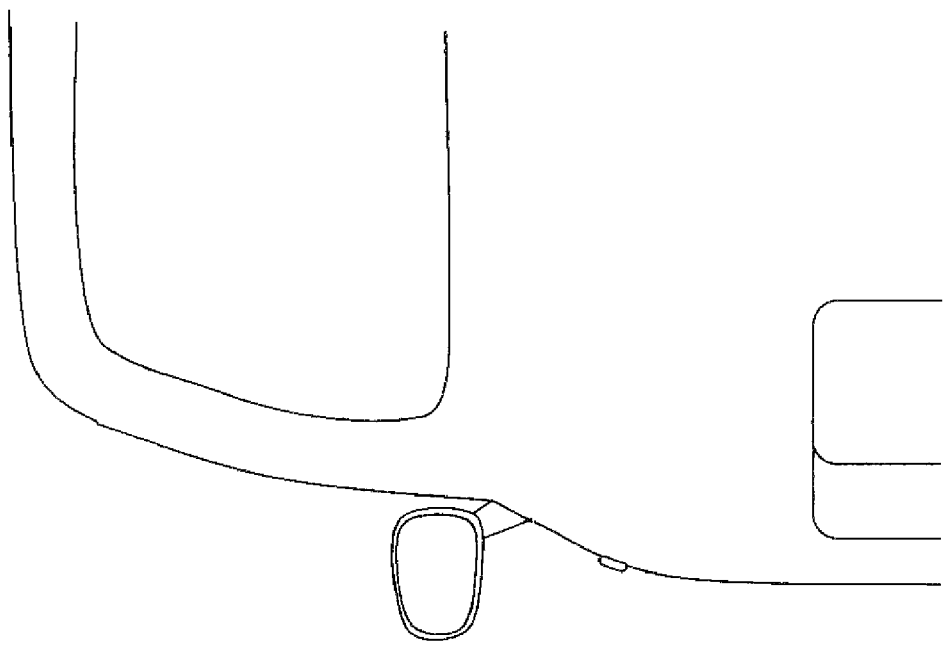

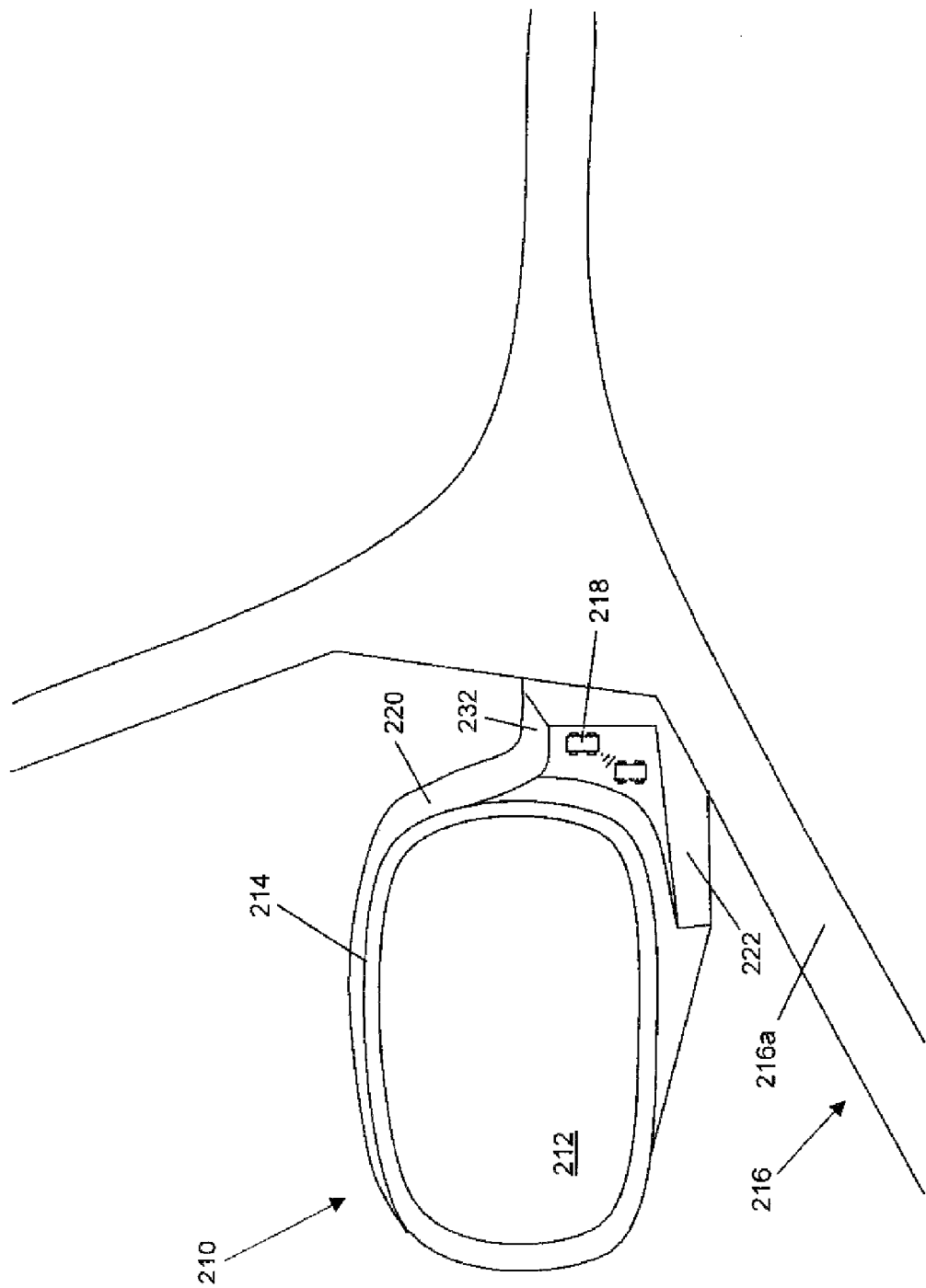

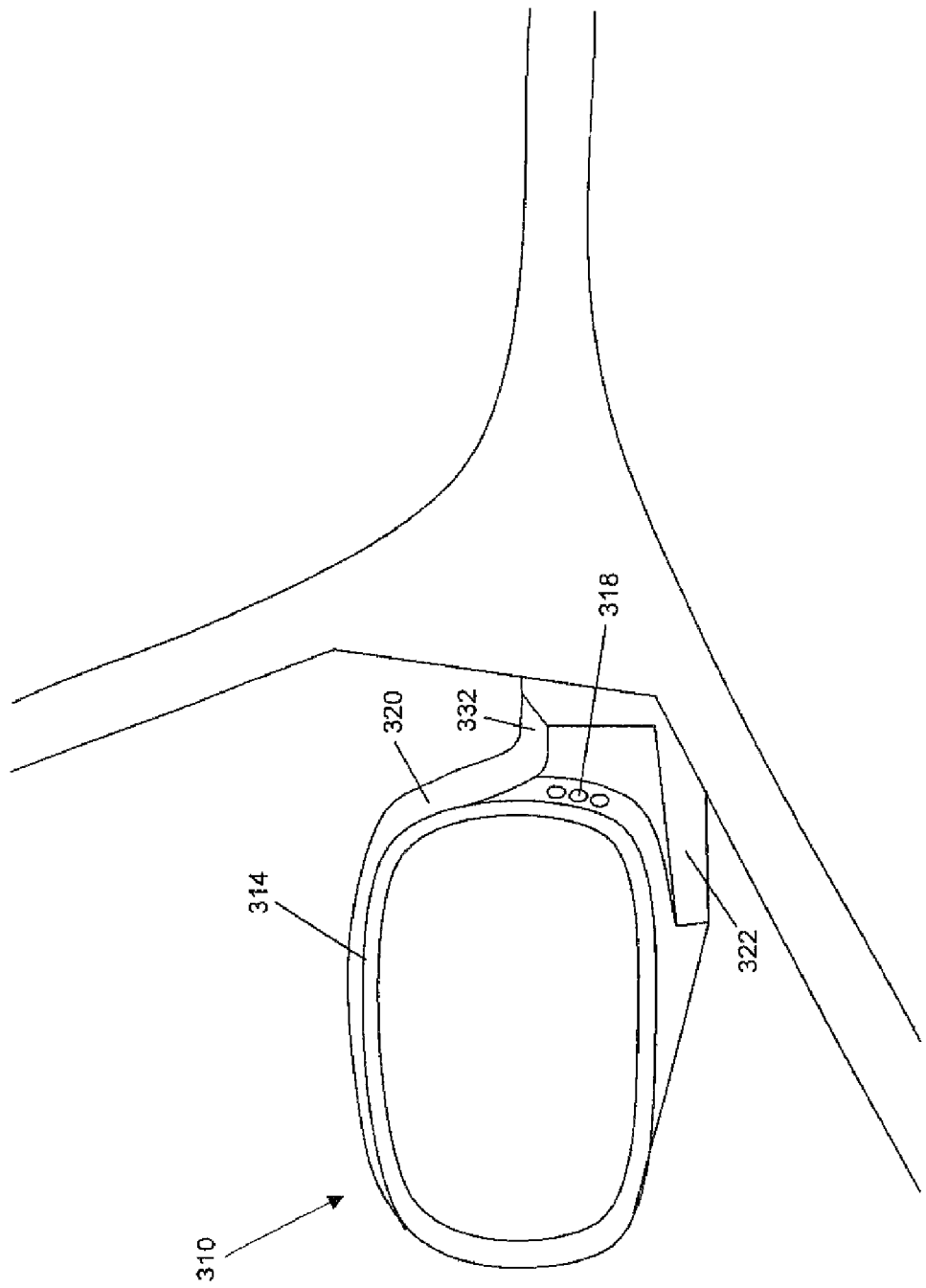

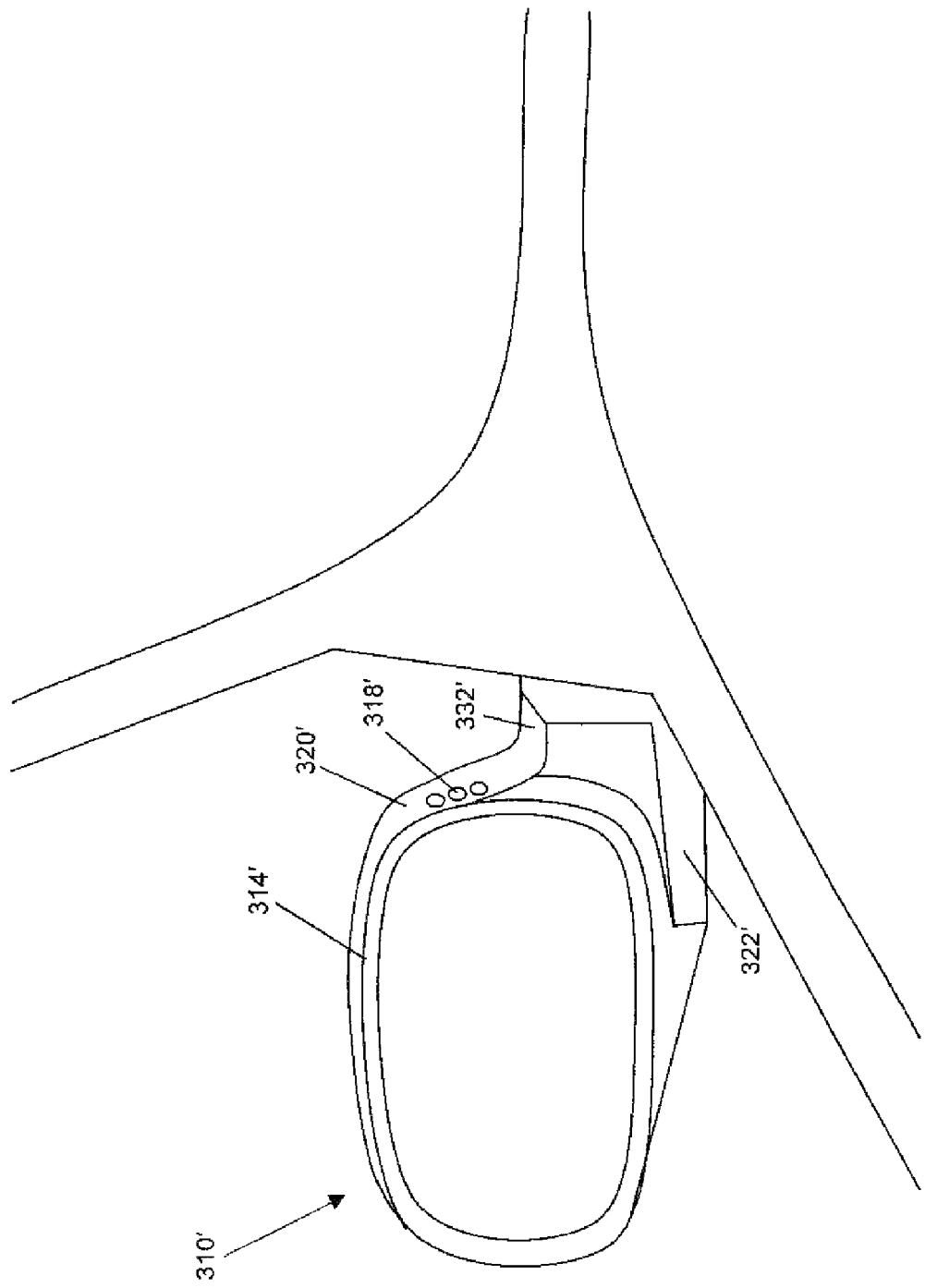

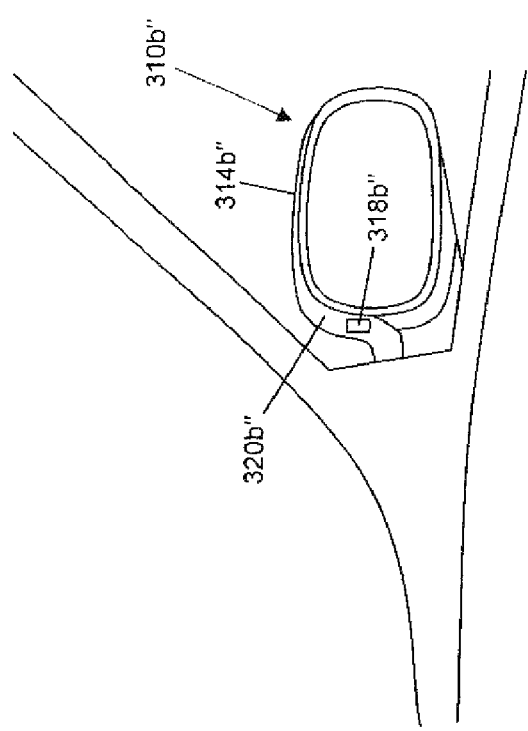
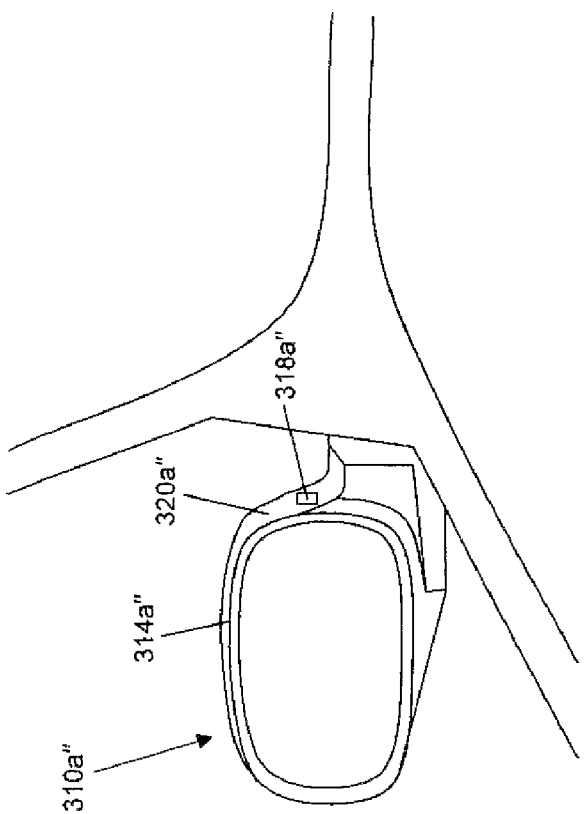

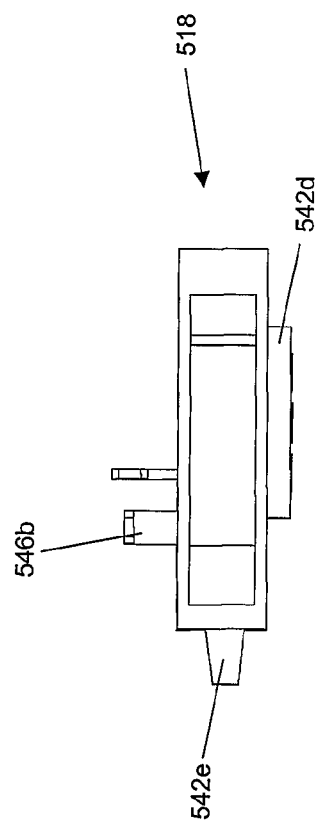
Fig. 16A
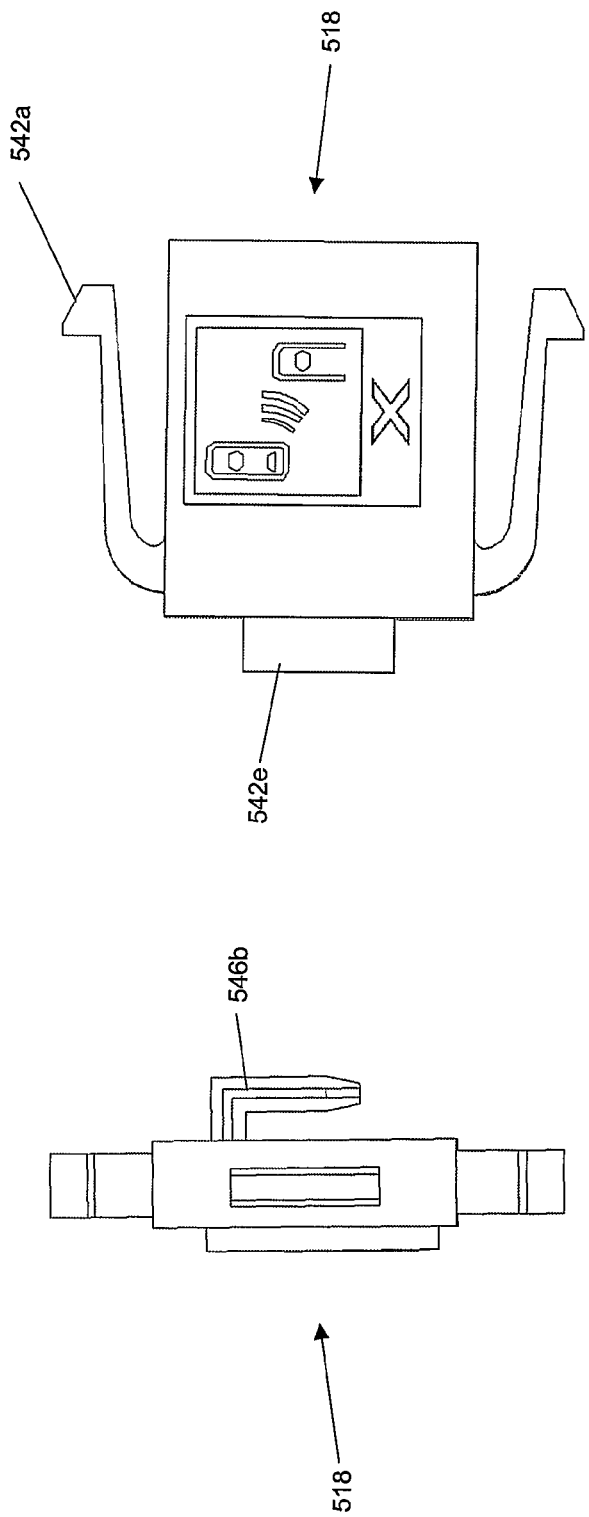
Fig. 16C
Fig. 16B

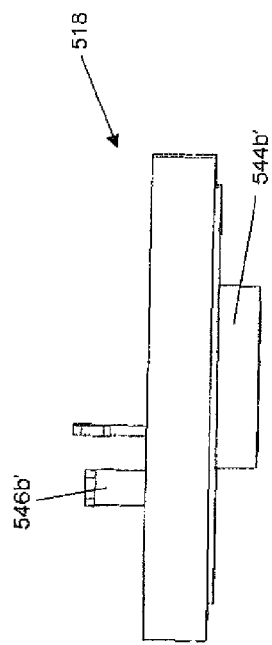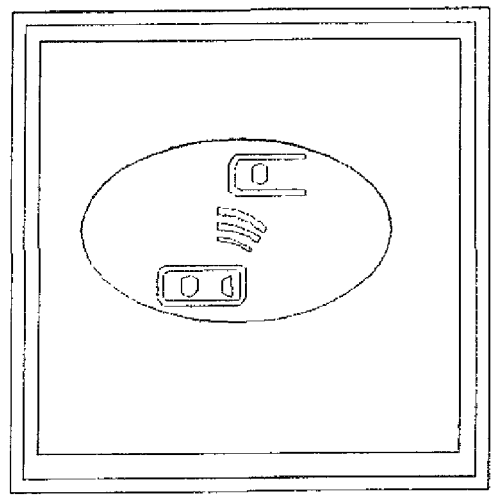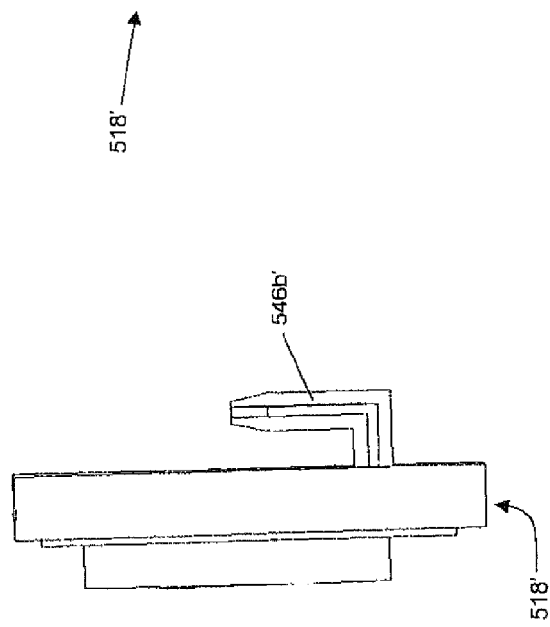
Fig. 25A
Fig. 25B
Fig. 25C

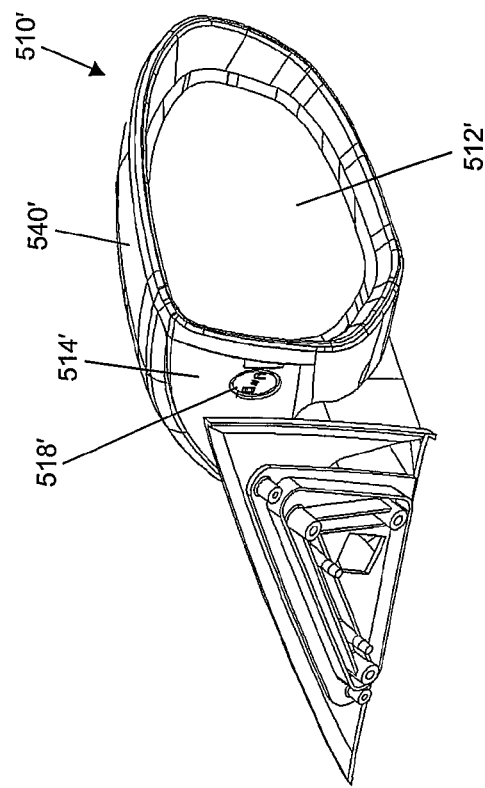
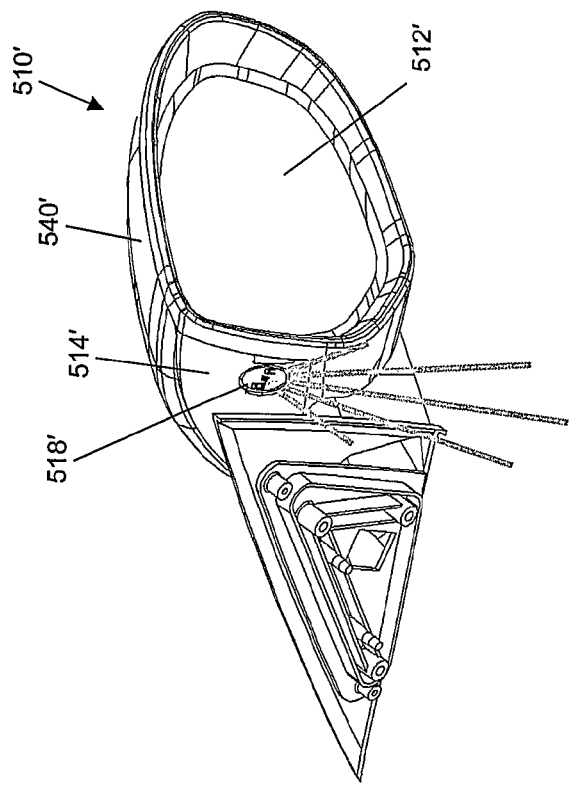

VEHICLE EXTERIOR REARVIEW MIRROR SYSTEM WITH BLIND SPOT INDICATOR

CROSS REFERENCE TO RELATED APPLICATIONS

The present application is a continuation of U.S. patent application Ser. No. 12/370,050, filed Feb. 12, 2009, now U.S. Pat. No. 7,760,111, which is a continuation of U.S. patent application Ser. No. 11/994,471, filed May 9, 2008, now U.S. Pat. No. 7,492,281, which is a 371 national phase application of PCT Application No. PCT/US2006/026148, filed Jul. 5, 2006, which claims benefit of U.S. provisional applications, Ser. No. 60/696,953, filed Jul. 6, 2005; and Ser. No. 60/784,570, filed Mar. 22, 2006, which are hereby incorporated herein by reference in their entireties.

FIELD OF THE INVENTION

The present invention relates to exterior rearview mirror assemblies and, more particularly, to an exterior rearview mirror assembly having a blind spot indicator and/or a lane change aid (LCA) indicator at the mirror assembly.

BACKGROUND OF THE INVENTION

It is known to provide a blind spot detection/LCA system for a vehicle that detects the presence of another vehicle or object in the lane next to the host vehicle, where it may be difficult for the driver of the host vehicle to determine whether or not there is another vehicle or object adjacent to the host vehicle. Such a blind spot detection/LCA system often includes a visual indicator that visually indicates to the driver that another vehicle or object has been detected. The visual indicator (commonly a light emitting diode or the like) is often located at the reflective mirror element of the exterior rearview mirror assembly and external of the vehicle cabin, or may be located interior to the vehicle, such as at the A-pillar of the vehicle within the interior of the vehicle cabin (such as on MY 2005 Volvo vehicle models equipped with camera-based BUS systems). The visual blind spot/LCA indicators indicate or alert to the driver of the host vehicle the presence or impending presence of another vehicle in a blind spot in an adjacent side lane that typically cannot be readily seen within the field of view of the exterior mirror reflective element of the exterior mirror assembly mounted at that side of the vehicle and/or cannot be readily seen by the driver's peripheral vision or the like. The visual blind spot/LCA indicators typically must be viewable principally or solely by the driver of the host vehicle and not by drivers of other vehicles. If the indicator is located external to the vehicle cabin, and especially since it is now common to use turn signals on exterior mirrors, any visibility of the indicator to the driver of another vehicle (such as a trailing vehicle or an overtaking vehicle) may cause confusion to the driver of the other vehicle as to whether or not the indicator is a turn signal indicator or some other vehicle lighting or the like. This may be particularly problematic when the blind spot indicator is located behind (and often supported by) the reflective mirror element of the vehicle exterior mirror assembly, and may be especially confusing if other indicators are also disposed behind/supported by the mirror reflective element so as to function, for example, as turn signal indicators. For example, somewhat costly and complicated blind spot indicator constructions have been contemplated that, when placed behind and supported by the mirror reflective element, attempt to have their projected beam of emitted light shielded from view by other drivers and attempt to be directed principally to be viewed by the driver of the host vehicle. This can be further complicated by the fact that the mirror reflective element (and hence any blind spot indicator supported thereon/therebehind) is adjustable via a mirror actuator (such as described in U.S. Pat. Nos. 6,755,544; 6,616,314; 6,467,920; and 6,243,218, which are hereby incorporated herein by reference in their entireties), so that the axis of principal illumination of the blind spot indicator will move with movement of the mirror reflective element.

Thus, prior art blind spot/LCA indicators are often supported by and to the rear of the movable mirror reflective element, so as to be viewable by a driver of the host vehicle through the reflective element of the mirror assembly. For example, a transmissive window may be formed in the reflective coating or coatings of the reflective element and an illumination source or indicator may be positioned so as to direct or emit illumination through the window and toward the driver of the host vehicle so as to be viewable by the driver of the host vehicle. Alternately, transflective mirror coatings (such as, for example, those described in U.S. Pat. Nos. 6,855,431; 5,724,187; 5,340,503; 6,286,965; 6,196,688; 5,535,056; 5,751,489; and 6,065,840, which are hereby incorporated herein by reference in their entireties) may be used.

Because of vehicle regulations and mirror and vehicle configurations and geometries, and because of the need to provide an uninterrupted reflective surface to satisfy the likes of the FMVSS 111 field of view regulation, blind spot/LCA indicators in the prior art are typically located towards or at the outboard edge, and typically towards or at the upper corner/quadrant, of the reflective mirror element of the exterior mirror assembly. Thus, the prior art blind spot/LCA indicators are located at a distal or furthest outboard location of the mirror reflective element, such that the driver of the host vehicle typically has to look across to the outboard dimension of the reflective element to view and discern the blind spot indicator. Also, the blind spot/LCA indicators (when located at the reflective element so as to be viewable through the reflective element and when supported thereon such that the blind spot/LCA indicator moves in tandem with the mirror reflective element when its field of view is adjusted by the driver to his/her preferences) may be directed differently for different drivers. These prior art blind spot/LCA indicators thus are not provided at a universally controllable angle or fixed angle relative to the geometry of the vehicle and thus may not be optimally directed for viewing by some drivers, depending on the desired and set angle of the mirror reflective element for the particular driver of the host vehicle and/or may not be optimally directed for non-viewing by drivers of other vehicles, such as trailing or overtaking vehicles that are part of the traffic encountered by the host vehicle.

A variety of interior and exterior mirror assemblies with indicators are known in the art, such as U.S. Pat. Nos. 5,788,357; 6,257,746; 6,005,724; 5,481,409; 6,512,624; 6,356,376; 2,263,382; 2,580,014; 3,266,016; 4,499,451; 4,588,267; 4,630,904; 4,623,222; 4,721,364; 4,906,085; 5,313,335; 5,587,699; 5,575,552; 5,938,320; and 5,786,772, Canadian Pat. No. CA 1,063,695, Pat. Abstracts of Japan Publication No. 0917573, published Jul. 8, 1997, which are all hereby incorporated herein by reference in their entireties.

Therefore, there is a need in the art for an improved blind spot/LCA indicator that is readily viewable by a driver of the host vehicle and not visible or viewable by a driver of another vehicle.

SUMMARY OF THE INVENTION

The present invention provides a blind spot indicator or lane change assist (LCA) indicator that is fixedly located at the mirror shell or casing and/or at a support arm of an exterior rearview mirror assembly, so as not to move or adjust when the mirror reflective element is moved or adjusted to set its field of view. Preferably, the blind spot indicator is fixedly located at the inboard wall or portion of the mirror shell or casing, so as to be readily viewed by the driver of the host vehicle, while being substantially non-visible or non-viewable by a driver of another vehicle. The blind spot/LCA indicator is preferably located at an angled, outwardly extending rearward portion of the mirror assembly that is angled so as to slope or extend at an angle away from the body side of the vehicle, so that the blind spot/LCA indicator is generally facing the driver of the host vehicle and is readily viewable by the driver of the host vehicle and substantially non-visible or non-viewable by a driver of another vehicle at or approaching the host vehicle.

According to an aspect of the present invention, an exterior rearview mirror assembly for a vehicle includes a reflective element, a mirror shell or casing and a blind spot indicator. The shell or casing has an inboard portion that is inboard of the reflective element relative to the position of the reflective element with respect to the body side of the vehicle when the exterior mirror assembly is mounted thereto, and thus is between the reflective element and the body side of the vehicle to which the mirror assembly is attached. The blind spot indicator is located at and oriented at the inboard portion of the mirror shell or casing so as to be viewable by the driver of the vehicle and so as to be substantially to totally non-viewable by the drivers of other vehicular traffic, such as other vehicular traffic rearward of, sideward of, approaching, overtaking, forward of or otherwise at or near the host vehicle.

The inboard portion of the mirror shell or casing (which at least in part defines a cavity within which the mirror reflective element is disposed and within which the mirror reflective element is adjustable) may comprise an inboard wall of the mirror shell or casing. Typically, the exterior mirror assembly comprises a stalk or support arm or member of the mirror assembly that extends from the side of the vehicle to where the mirror shell is disposed.

The blind spot indicator may include a light source or illumination source (such as one or more light emitting diodes (LEDs) or the like), and may include a lens or other optic or light directing/guiding device or element or means or a light channel, conduit or means, or a light baffle or means, or a light louver or blind or means, or a light directing element or means, preferably at the mirror shell or casing (and substantially disposed therein so as not to overly protrude to create aerodynamic drag and so as to provide an aesthetically pleasing exterior appearance) for directing the light emitted by the light source toward the driver for viewing by the driver of the host vehicle and, if required, for limiting or restricting viewing by drivers of other vehicles.

Thus, the present invention provides an exterior rearview mirror assembly for a vehicle that includes a mirror shell portion and a blind spot or lane change assist (LCA) indicator. A cavity of the mirror shell portion is formed or defined at least partially by the walls of the shell portion. A variety of suitable mirror shells are known in the exterior mirror assembly art, such as skull-cap mirror shells (such as described in U.S. Pat. Nos. 6,612,708; 6,447,130; and 6,310,738, which are hereby incorporated herein by reference in their entireties), uni-body mirror shells, and the like. A reflective element is disposed within the cavity, along with any accessories or displays and associated adjustment device or actuator associated with the reflective element or mirror assembly. The mirror shell consists of an inner or inboard wall or side or portion that, when the mirror assembly is mounted at the side of the vehicle, preferably proximate to or at the driver or passenger side front door and proximate to or at the join of the door to the front portion of the vehicle body side (often referred to as the A-pillar region of the vehicle), the inner wall portion is at or near to the vehicle side body and readily viewable by the driver of the host vehicle. The mirror shell also includes an outer or outboard side or wall or portion that is further from the side of the vehicle and outward or outboard from the inner or inboard wall or portion. The mirror reflective element is disposed within the mirror shell and between the inner wall or portion or side and the outer wall or portion or side of the mirror shell. The blind spot or LCA indicator is located at the inboard or inner wall or side or portion of the mirror shell and, thus, is readily viewable by the driver of the host vehicle.

The mirror assembly is mounted to the body side of the vehicle (such as to a front door portion or to a vehicle body portion, depending on the particular application of the mirror assembly). The mounting portion of the mirror assembly often includes a stalk or mounting arm or member or support arm or member that extends from the mounting area of the vehicle body side to where the mirror shell is disposed. The mounting arm may extend from the vehicle body side by about an inch or more, and often about two to three inches or thereabouts, depending on the styling, type or size of the vehicle and associated exterior mirror assembly.

Note that, and as can be readily seen in FIGS. 6A and 6B, the inner portion of the driver side mirror assembly is most readily visible/viewable to the driver of the vehicle, as compared to the inner portion of the passenger side mirror assembly. The blind spot/LCA indicator of the present invention is thus highly suited for applications where the blind spot indicator is on the driver side only. However, it is envisioned that a blind spot/LCA indicator of the present invention may also or otherwise be located at the inner or inboard portion or wall or side of the passenger side exterior rearview mirror assembly, without affecting the scope of the present invention.

According to another aspect of the present invention, an exterior rearview mirror system for a vehicle includes an exterior mirror assembly having a mirror casing. The mirror casing comprises a mirror portion including a reflective element and an attachment portion configured for attaching the mirror assembly at an exterior side of a vehicle, such as via an attachment or attachment element for attaching the mirror assembly at the exterior side of the vehicle, such as via any suitable attachment element or means, such as are known in the automotive mirror art. The reflective element is adjustably supported by an actuator within the mirror portion of the mirror casing. The mirror casing has an inboard portion that faces generally toward the exterior side of the vehicle and is viewable by a driver of the vehicle when the exterior mirror assembly is attached at the exterior side of the vehicle. The mirror system includes a unitary indicator module at the inboard portion of the mirror casing. The unitary indicator module comprises an illumination source, and is responsive to a control signal to activate the illumination source to indicate to the driver a detected presence of an object at least one of alongside the vehicle and rearward of the vehicle. The unitary indicator module is substantially sealed so as to be substantially impervious to water. The unitary indicator module is configured at the inboard portion of the mirror casing so that illumination of the illumination source is readily viewable by the driver of the vehicle and wherein the illumination of the illumination source is generally not viewed by other road users when the exterior rearview mirror assembly is mounted to the side of the vehicle and when the vehicle is operated on a road.

According to another aspect of the present invention, a method of supplying an exterior rearview mirror system for a vehicle includes providing mirror casings, with each mirror casing at least comprising a mirror portion including a reflective element. The reflective element is adjustably supportable by an actuator within the mirror portion of the mirror casing. Each of the mirror casings has an inboard portion that faces generally toward the exterior side of the vehicle and that is viewable by a driver of the vehicle when the exterior mirror assembly is mounted at the exterior side of the vehicle. At least some of the mirror casings are provided with an aperture established at the inboard portion. Blind spot indicator units are provided, with each of the blind spot indicator units comprising at least one illumination source for indicating to the driver a detected presence of an object at least one of alongside and rearward of the vehicle. First mirror assemblies are established by disposing the blind spot indicator units at the apertures of the inboard portions of the at least some of the mirror casings. The blind spot indicator units are at least partially received at the apertures. Second mirror assemblies are established by providing mirror casings lacking an aperture established at the inboard portion. The first mirror assemblies are supplied to a vehicle manufacturing facility when inclusion of a blind spot indicator is required and the second mirror assemblies are supplied to a vehicle manufacturing facility when inclusion of a blind spot indicator is not required.

Therefore, the present invention provides a blind spot indicator at an inboard wall or portion of an exterior rearview mirror assembly. The blind spot indicator is located at an inboard wall or portion of the mirror casing or shell or at an inboard support arm or the like of the mirror assembly and, thus, is readily viewable by the driver of the host vehicle, and without the driver having to look across to the outboard dimension of the mirror reflective element to see or notice actuation or illumination of the blind spot indicator. The blind spot indicator thus may be readily viewable by the driver and may be so viewable without the driver having to look at the reflective element of the exterior mirror to see the blind spot indicator. Also, because the blind spot indicator is located at the inboard portion of the mirror assembly, the blind spot indicator is viewable principally or solely by the driver of the host vehicle, and is not readily viewable or visible to a driver of another vehicle. Because the blind spot indicator is not located at a primary viewing area, the curb-side appeal or appearance of the vehicle is not adversely impacted by the choice and styling of the blind spot indicator. Also, because the blind spot indicator of the present invention is not located behind a window in the reflective element, or behind a transflective portion of the reflective element, the blind spot indicator may be fixedly placed and may provide a low cost indicator that may be readily incorporated into an exterior rearview mirror assembly of a vehicle.

These and other objects, advantages, purposes and features of the present invention will become apparent upon review of the following specification in conjunction with the drawings.

BRIEF DESCRIPTION OF THE DRAWINGS

FIG. 3 is a perspective view of another exterior mirror assembly similar to FIG. 1, shown with the indicator as a hazard icon;

FIG. 4 is a perspective view of a vehicle with an exterior mirror assembly and blind spot indicator of the present invention, shown as the driver of a trailing vehicle may view the vehicle and exterior mirror assembly;

FIG. 7 is a perspective view of another exterior mirror assembly with a blind spot indicator in the support arm of the mirror assembly in accordance with the present invention, shown with the indicator as an ISO icon;

FIG. 10 is a perspective view of another exterior mirror assembly similar to FIG. 7, shown with a multi-stage indicator at the side of the mirror shell;

FIG. 11 is a perspective view of another exterior mirror assembly similar to FIG. 10, with the indicator at the side of the mirror shell and above the support arm;

FIGS. 12A and 12B are perspective views of the driver and passenger side exterior mirror assemblies of a vehicle, with blind spot indicators in accordance with the present invention;

FIGS. 16A-C are plan views of the blind spot indicator module of FIG. 14;

FIGS. 25A-C are plan views of the blind spot indicator module of FIG. 24;

FIGS. 27A and 27B are perspective views of the exterior mirror assembly and blind spot indicator module of FIG. 26;

DESCRIPTION OF THE PREFERRED EMBODIMENTS

Figure 1:
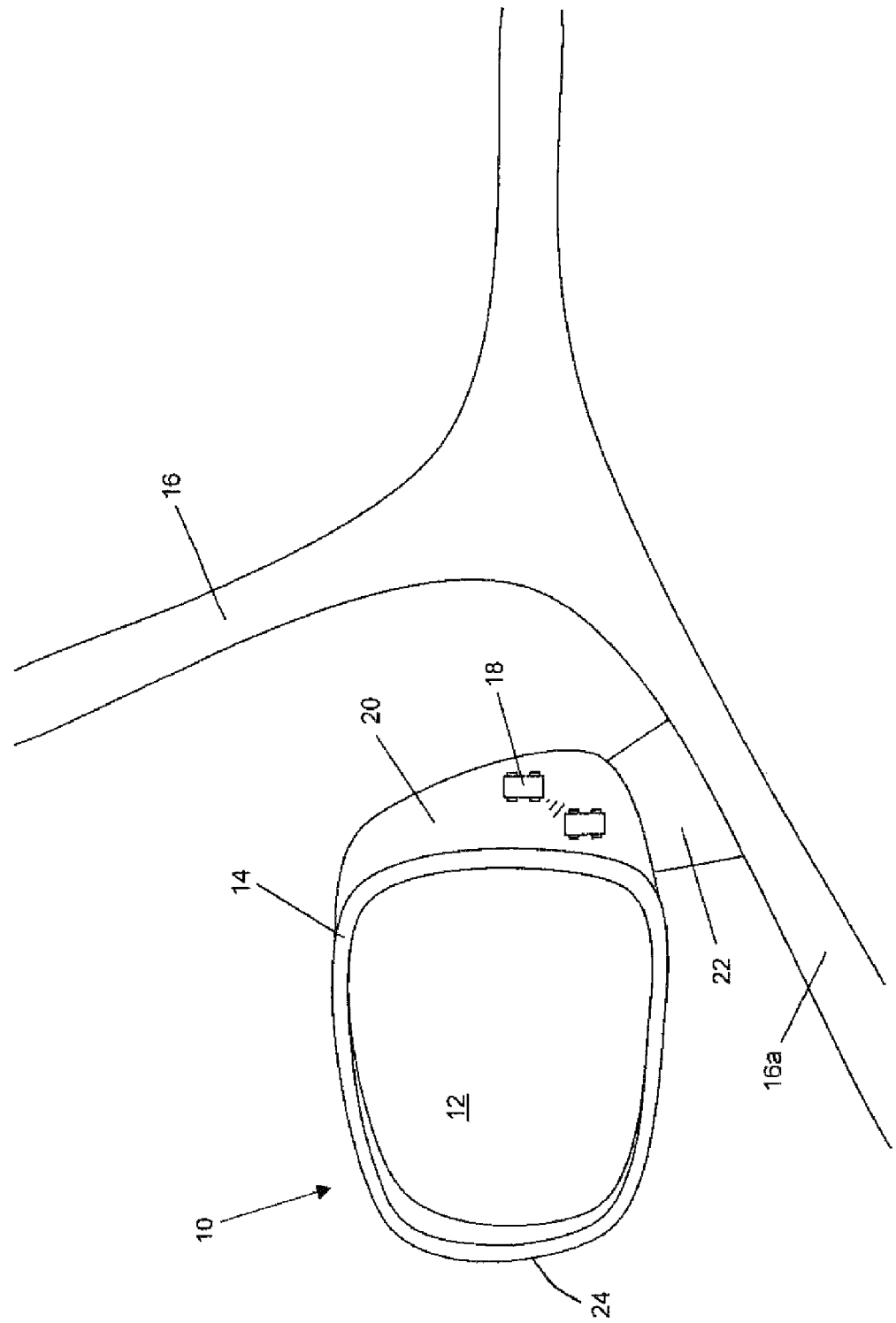
FIG. 1 is a perspective view of an exterior mirror assembly with a blind spot indicator in accordance with the present invention, shown with the indicator as an ISO icon.

Referring now to the drawings and the illustrative embodiments depicted therein, an exterior rearview mirror assembly 10 for a vehicle includes a reflective element 12 and a mirror shell or casing 14 (FIG. 1). Mirror assembly 10 is mounted at the side 16a of a host or subject vehicle 16, and includes a blind spot indicator 18 at an inboard portion 20 of mirror assembly 10. The blind spot indicator 18 is operable by illumination to indicate to the driver of the subject or host vehicle that an object or other vehicle is detected at the side or blind spot region of the host vehicle by a blind spot detection system, as discussed below. The indicator may be activated or energized in response to a detection of an object or other vehicle approaching or adjacent to the host vehicle in order to alert or warn the driver of the host vehicle not to attempt or initiate a lane change that moves the subject or host vehicle into the already occupied (or soon to be occupied) side lane or region adjacent either the driver side or the passenger side of the host vehicle.

Mirror assembly 10 is connected at the side 16a of vehicle 16 and includes a mounting arm or stem 22 or the like, which is mounted to or extends from the side 16a of vehicle 16. In the illustrated embodiment of FIG. 1, the inboard portion 20 of mirror assembly 10 comprises the inboard wall or side of the mirror shell or casing 14. The inboard portion or wall is at the inboard side of the casing 14 of the mirror assembly and generally faces the side 16a of the vehicle 16. As can be seen in FIG. 1, the inboard portion 20 is spaced from and opposite from an outboard portion or side 24 of the mirror assembly 10.

The exterior rearview mirror assembly may comprise a fixed exterior rearview mirror assembly, whereby the mirror portion of the mirror casing and the attachment portion of the mirror casing form a uni-body. Alternately, and preferably, the exterior rearview mirror assembly may comprise a breakaway exterior rearview mirror assembly and more preferably, the exterior rearview mirror assembly may comprise a powerfold exterior rearview mirror assembly. For example, the exterior rearview mirror assembly may comprise a fixed or foldable or breakaway or powerfold mirror assembly, whereby the mirror casing may encompass an attachment portion that attaches to the side of the vehicle, and a mirror or reflective element portion (that supports the reflective element) that is attached to and supported by the attachment portion. The reflective element is mounted at an actuator (such as a manual actuator or an electronic actuator) within the mirror portion of the mirror casing so that the rearward field of view of the driver is adjustable via adjustment of the reflective element.

Typically, side exterior rearview mirror assemblies for vehicles extend from the side of the vehicle and are angled to reduce aerodynamic drag and to provide an aesthetically pleasing appearance. Thus, the inboard portion of the exterior rearview mirror may be angled outwardly from the vehicle and thus slopes away from vehicle and provides a surface at which to mount/install the blind spot indicator, whereby the blind spot indicator is generally facing the driver of the host vehicle while being generally or substantially or entirely hidden from the view of drivers of other vehicles encountered by the host vehicle. Also, because the indicator is located at the inboard portion of the mirror shell or casing, the indicator may be selected to be substantially large, since the size of the indicator is not constrained by the field of view regulations of the mirror reflective element. The blind spot indicator of the present invention thus may be located at the mirror inboard wall or portion or side, which is contoured so that the wall or surface slopes away from the body side of the vehicle. By positioning the indicator at this location, the presence of the indicator at the inboard or inner wall or side of the exterior mirror is substantially or totally obscured from the view of drivers of trailing or side overtaking vehicles by the very body and structure of the exterior mirror. Also, because of the natural aerodynamic styling and structure of the inboard wall portion or section, operation of the blind spot indicator is substantially or totally non-viewable by the drivers of leading vehicles (traveling in front of the host vehicle) or vehicles approaching the host vehicle from in front of the host vehicle.

Blind spot/LCA indicator 18 may include an illumination or light source (such as one or more light emitting diodes (LEDs) or organic light emitting diodes (OLEDs) or the like that is/are energized to direct or emit illumination toward the driver of the host vehicle. The illumination source may be positioned within or behind the inboard wall or portion of the mirror assembly and the indicator may include an iconistic display area (such as transparent or substantially transparent or translucent windows or apertures formed or established at the inboard wall so that the illumination passes through the windows for viewing and discerning by the driver of the host vehicle). The iconistic display may be established or formed at a lens or element that attaches to the shell or casing or may be formed or established at the shell or casing wall itself. The indicator may include baffles or light piping or tubing or electroluminescent foil or other light direction means or occluding means, such as louvers or shutters or filters or light directing film or the like for directing or guiding the illumination from the illumination source at the desired angle and through the inboard wall or portion so as to be principally or solely viewable by the driver of the host vehicle. Because the blind spot indicator is located at an area or region that is not readily viewable by a person outside of the vehicle cabin, the indicator may be located at the surface of the inboard wall or portion (and may protrude partially therefrom), and need not be recessed within the casing surface, without adversely affecting the appearance of the exterior mirror assembly. The location and degree of recess or inset of the blind spot indicator may be selected depending on the particular application of the blind spot indicator and on the location of any internal mirror content (such as an actuator, security light or other indicators or accessories or the like) located within the mirror shell.

As shown in FIG. 1, blind spot indicator 18 may comprise an ISO icon (showing icons representing the host vehicle and another vehicle at the side and/or rearward of the host vehicle) to indicate to the driver of the host vehicle that another vehicle has been detected at the side and/or rearward of the host vehicle. The iconistic representation may be formed as a translucent window or portion of the inboard wall or portion or may be otherwise established at the inboard wall or portion of the mirror assembly. Optionally, however, the indicator may comprise other forms, without affecting the scope of the present invention. For example, and with reference to FIG. 2, a blind spot indicator or LCA indicator 18' of an exterior mirror assembly 10' may comprise a multi-stage indicator having multiple indicating portions or elements or devices for indicating a degree of hazard or the like of an object or vehicle detected alongside and/or rearward of the host vehicle. The indicating portions or elements or devices may comprise different color indicators, such as green, amber and red or the like, to indicate the degree of hazard detected. For example, the multi-stage indicator may provide a first indication when no object is detected at the side lane adjacent to the vehicle, a second indication when an object is detected that is approaching the side lane area, and a third indication when an object is detected that is occupying the side lane area.

The multi-stage indicator may comprise multiple illumination sources selectively operable to indicate the degree of hazard detected, or optionally the different or multiple indications may be provided with one illumination source or indicating element. The first, second and third indications provide at least one of (a) first, second and third color indications and (b) first, second and third indication modulations (such as where one or more indicating elements is/are flashed or modulated or intermittently activated/deactivated to provide different indications) that are readily discernible and recognizable by the driver of the vehicle.

Figure 2:
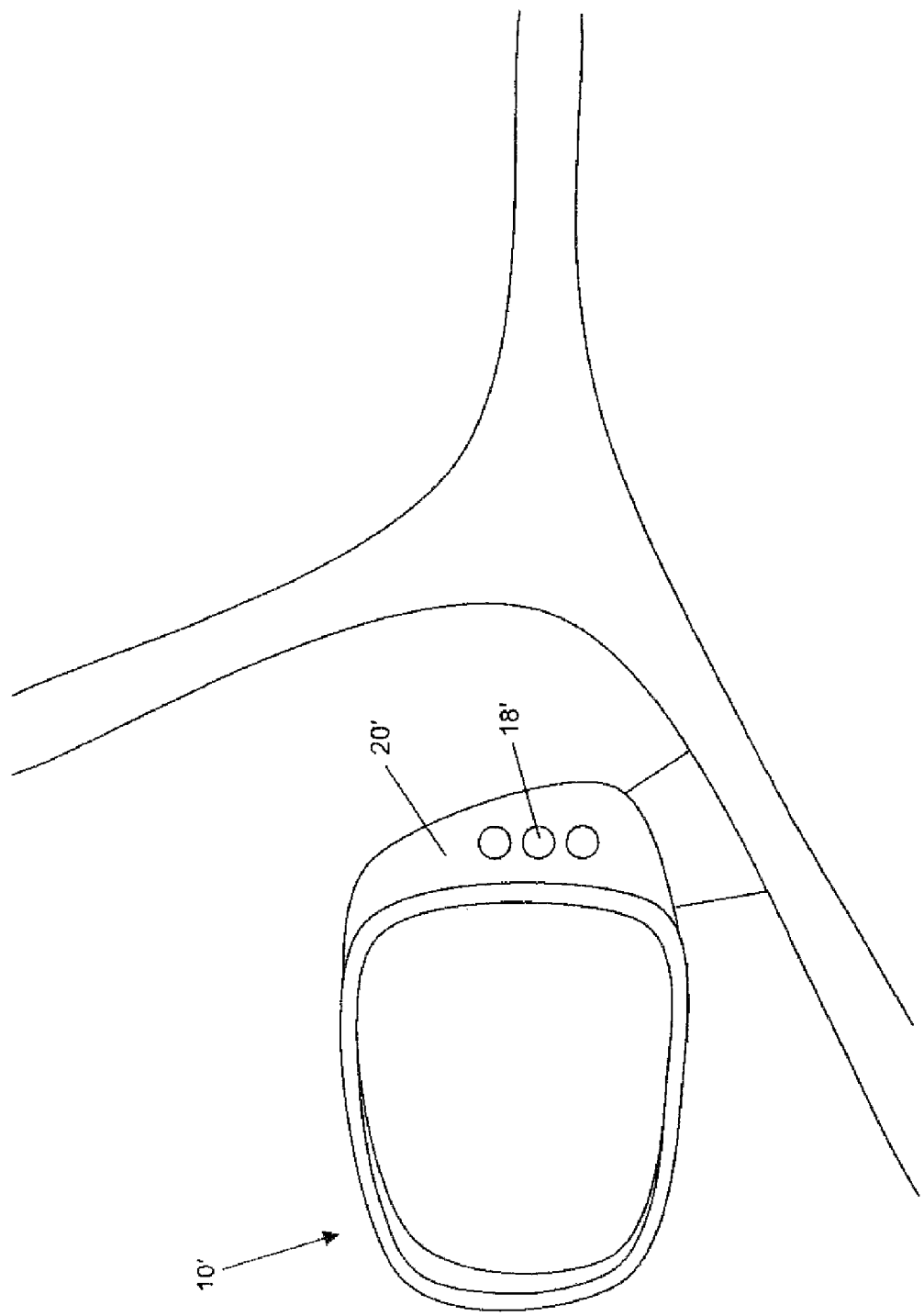
FIG. 2 is a perspective view of an exterior mirror assembly similar to FIG. 1, shown with the indicator as a multi-stage indicator.
Figure 2A:
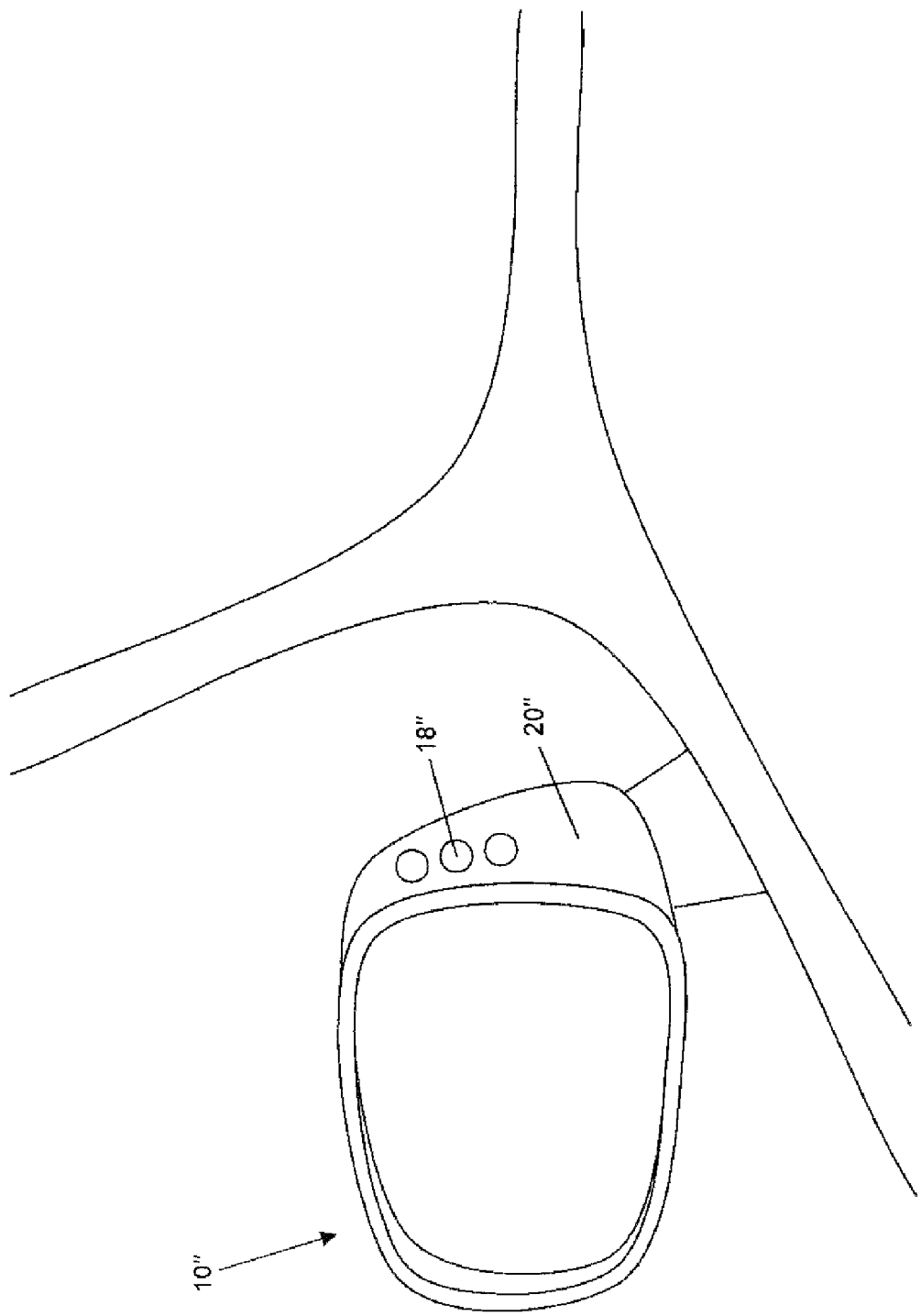
FIG. 2A is a perspective view of another exterior mirror assembly similar to FIG. 2, with the indicator located at an upper region of the inboard portion of the mirror assembly.

Such a multi-stage indicator is suitable for use with a lane change assist (LCA) system, and may, for example, provide a green indication when the adjacent side lane is clear, an amber indication when a vehicle approaches the side lane area, and a red indication when another vehicle is occupying the side lane area adjacent to the host vehicle. As shown in FIG. 2, the blind spot indicator or LCA indicator 18' may be positioned at a lower region of the inboard portion 20' of the mirror assembly 10', or (and as shown in FIG. 2A), the blind spot indicator 18" may be positioned at an upper region of the inboard portion 20" of the mirror assembly 10" (where the indicator may be more readily visible/viewable to the driver of the host vehicle). Optionally, for example, and with reference to FIG. 3, a blind spot indicator 18''' of an exterior rearview mirror assembly 10''' may comprise a hazard indicator or the like at the inboard portion 20''' to provide a hazard indication or warning or alert signal to the driver of the host vehicle when an object or vehicle is detected at the side and/or rearward of the host vehicle, and when the driver of the host vehicle is attempting a lane change or the like (such as when the driver activates the turn signal of the host vehicle). Other iconistic images or indicia or the like may be used for the blind spot/LCA indicator, without affecting the scope of the present invention.

Figure 5:
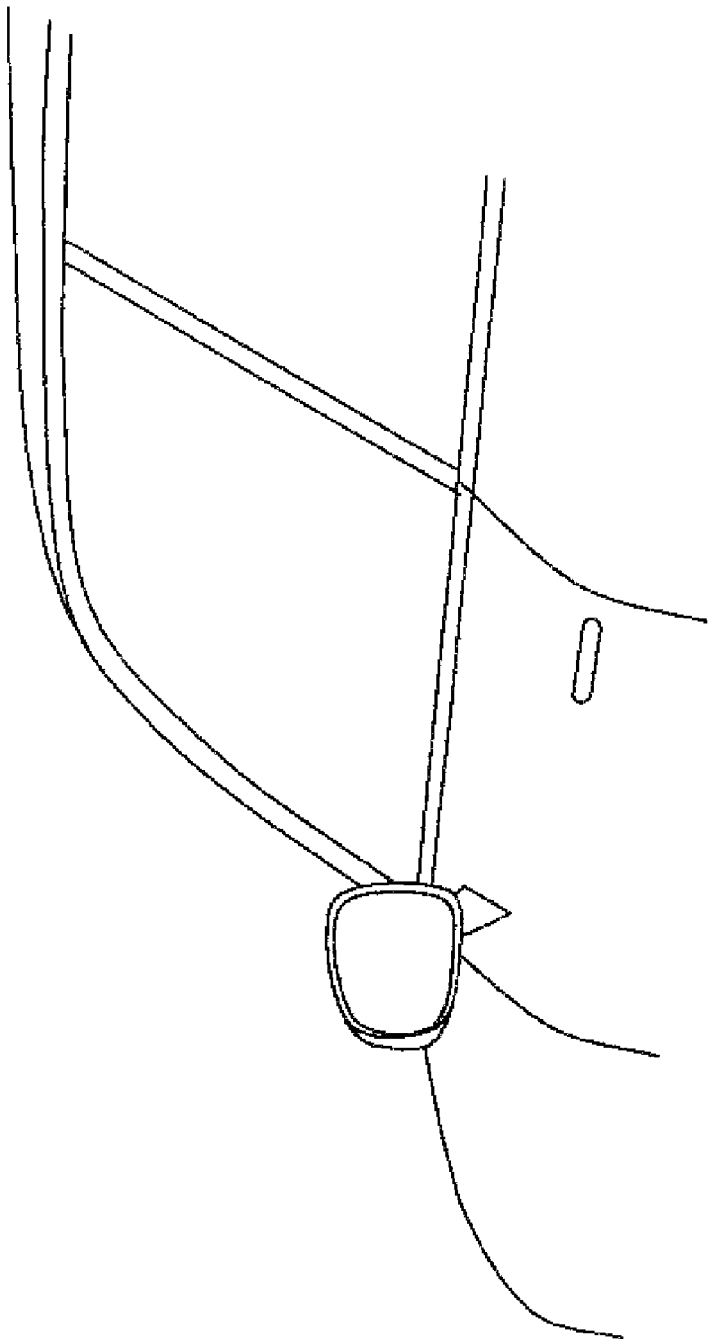
FIG. 5 is a perspective view of the vehicle of FIG. 4, shown as the driver of an overtaking vehicle may view the vehicle and exterior mirror assembly.

As can be seen in FIGS. 4 and 5, the blind spot indicator of the present invention is not readily viewable or discernible by other road users, such as a driver of a vehicle approaching the host vehicle from the rear of the host vehicle (as shown in FIG. 4) or a driver of a vehicle approaching and overtaking the host vehicle along a side of the host vehicle (as shown in FIG. 5). Although not shown, the blind spot indicator is also substantially not viewable by or visible to a driver of a vehicle ahead of or leading the host vehicle. The blind spot indicator of the present invention thus may be sufficiently large to enhance viewability and discernibility of the indicator by the driver of the host vehicle, without detracting from the appearance of the mirror assembly and without being readily viewable/discernible by the driver of another vehicle, thereby limiting or substantially precluding confusion (to the driver of the other vehicle) between a turn signal indicator (not shown) of the mirror assembly and the blind spot indicator.

Figure 6B:
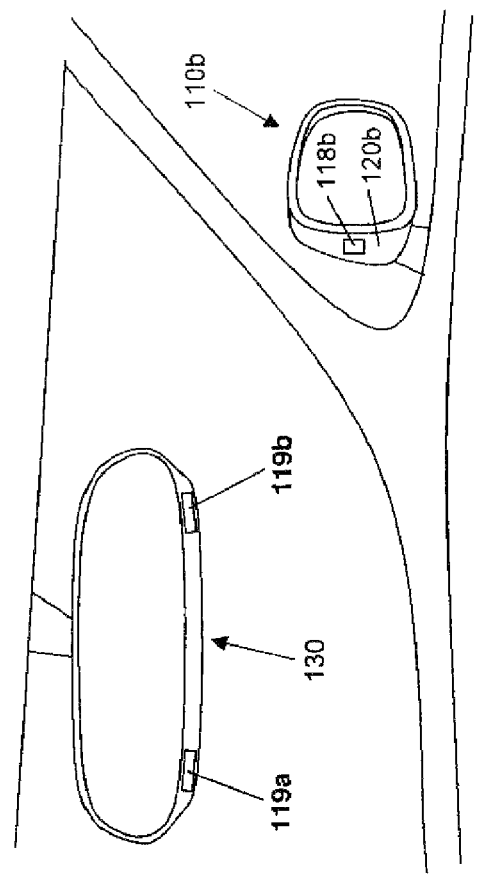
FIGS. 6A and 6B are perspective views of the driver and passenger side exterior mirror assemblies and of the interior rearview mirror assembly, with blind spot indicators in accordance with the present invention.
Figure 6A:
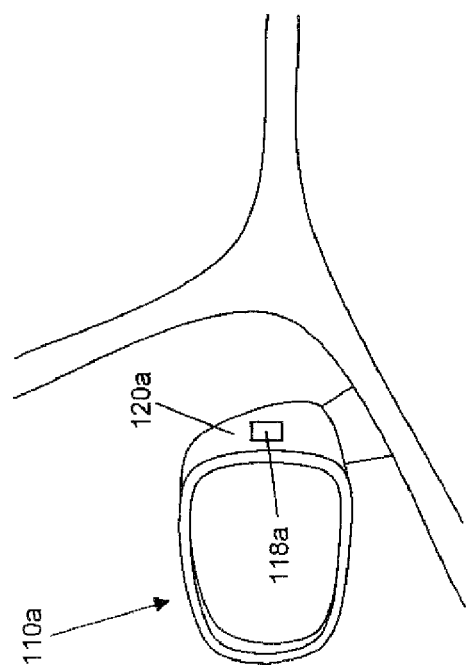

Although shown in FIGS. 1-5 and described above as being located at a driver side exterior mirror, the blind spot/LCA indicator of the present invention may also or otherwise be located at the passenger side exterior mirror, if desired. Optionally, the blind spot indicator of the present invention may be located at both the driver side mirror assembly and the passenger side mirror assembly of the host vehicle. The indicator at either side may be selectively activated or illuminated to indicate to the driver of the host vehicle that an object or other vehicle has been detected at that particular side lane region of the host vehicle. Optionally, the blind spot indicator may be associated with a blind spot detection and indication system that includes one or more indicators at the interior rearview mirror assembly of the host vehicle. For example, and with reference to FIG. 6, a blind spot indicator 118a may be located at an inboard portion or wall 120a of a driver side exterior rearview mirror assembly 110a, while a blind spot indicator 118b may be located at an inboard portion or wall 120b of a passenger side exterior rearview mirror assembly 110b. Also, an interior rearview mirror assembly 130 may include one or more indicators 119a, 119b that provide further indication to the driver of the host vehicle of a detection of an object or other vehicle at either side and/or rearward of the host vehicle, so that the driver of the host vehicle has a cognitive association of the indicators. The blind spot indicators may provide a redundant indication at both the interior and exterior mirrors in order to assist the driver in recognizing the conditions surrounding the host vehicle, such as by utilizing aspects of the blind spot detection system described in U.S. Pat. Nos. 6,198,409; 5,929,786; and 5,786,772, which are hereby incorporated herein by reference in their entireties.

Optionally, and with reference to FIG. 7, an exterior rearview mirror assembly 210 may include a reflective element 212 and a mirror casing or shell that includes a mirror portion 214 that is supported on a mounting arm or attachment portion 232, which includes an attachment element that is configured to attach or mount to the side 216a of the host vehicle 216 and/or which extends from the side 216a of the host vehicle 216. The blind spot indicator 218 may be located at an inboard portion 220 of the casing 214, such as at the support arm or attachment portion or stem 232 of the casing which mounts to the mounting arm 222. In the illustrated embodiment, the attachment portion 232 of the casing is pivotally mounted to the mounting arm 222, such as for a powerfold exterior mirror or a breakaway exterior mirror or the like. The inboard portion 220 thus may be positioned along the mirror portion 214 or attachment portion 232 (and preferably along a surface that is angled outwardly with respect to the vehicle side), and could optionally and less desirably be located at the support or mounting arm 222, so as to be directed generally toward the driver of the host vehicle and not readily viewable by other road users or drivers of other vehicles at or near the host vehicle.

Figure 8:
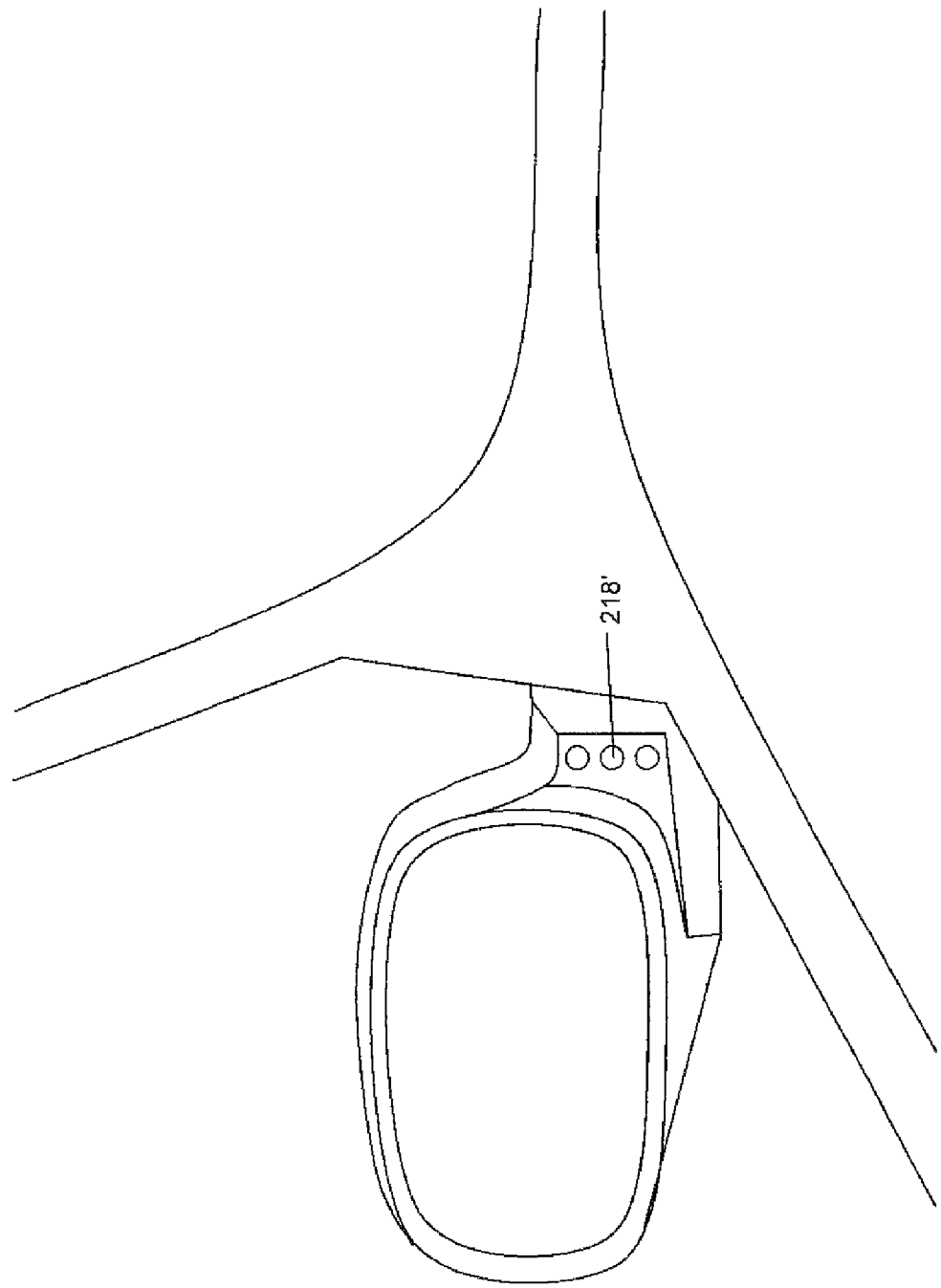
FIG. 8 is a perspective view of an exterior mirror assembly similar to FIG. 7, shown with the indicator as a multi-stage indicator.
Figure 9:
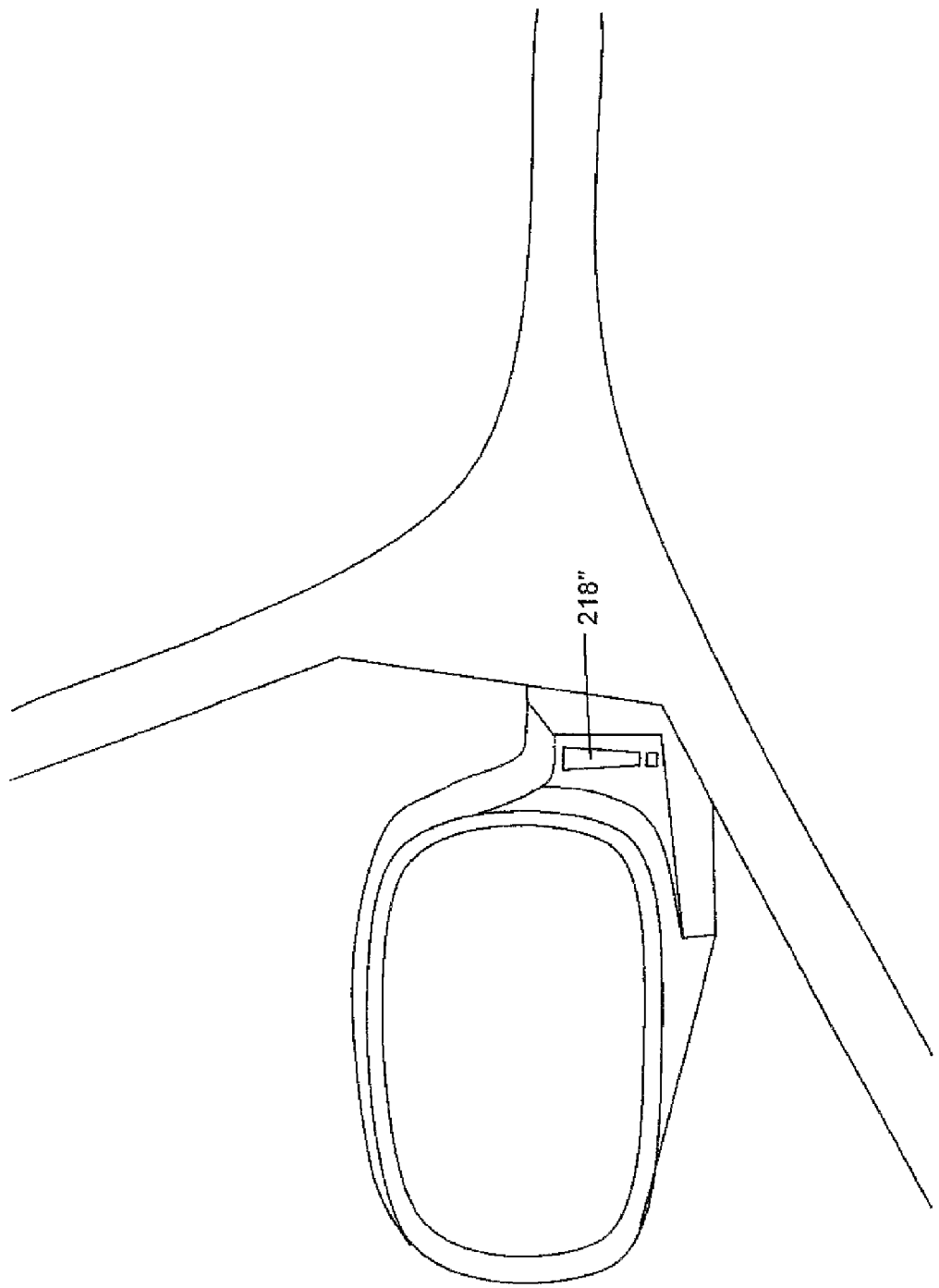
FIG. 9 is a perspective view of another exterior mirror assembly similar to FIG. 7, shown with the indicator as a hazard icon.

As shown in FIG. 7, the indicator 218 may comprise an ISO indicator with the iconistic representation of the host vehicle and adjacent or approaching vehicle, such as described above with respect to FIG. 1. Optionally, and such as described above with respect to FIGS. 2 and 3, the blind spot indicator may comprise a multi-stage indicator 218' (FIG. 8) or a hazard indicator 218" (FIG. 9) at the support arm or stem of the mirror assembly.

Optionally, and as shown in FIG. 10, the blind spot indicator 318 (such as a multi-stage indicator or other type of indicator) may be located at the inboard wall 320 of the mirror casing 314 of an exterior mirror assembly 310 and generally at or rearward of the support arm or stem 332 (which mounts to a mounting arm or portion 322 at the vehicle and which may be pivotable relative to the mounting arm or portion 322) of the casing 314 (where the indicator is rearward of the support arm and thus facing generally rearwardly with respect to the forward direction of travel of the vehicle, and preferably on an outwardly angled portion so as to be facing partially inward toward the driver of the vehicle). The indicator thus is readily viewable by the driver of the host vehicle at the mirror casing and rearward of the support arm or stem of the mirror assembly. As shown in FIG. 11, the blind spot indicator 318' may be located at the inboard portion 320' of the casing 314' of an exterior mirror assembly 310' and generally above the support arm or stem 332' (which mounts to the mounting arm or portion 322'), if desired. The particular location of the blind spot indicator may be selected depending on the geometries and content of the mirror assembly and support arm and mounting portion of the mirror assembly and on the vehicle door design and/or the vehicle A-pillar design, so as to provide enhanced viewability and discernibility of the blind spot indicator to the driver of the host vehicle. As shown in FIGS. 12A and 12B, a blind spot indicator 318a" may be located at the inboard portion 320a" of the casing 314a" of a driver side exterior mirror assembly 310a", while a blind spot indicator 318b" may be located at the inboard portion 320b" of the casing 314b" of a passenger side exterior rearview mirror assembly 310b", so that the indicators 318a", 318b" are readily viewable and discernible by the driver of the host vehicle while being substantially non-viewable to drivers of other vehicles at or near or trailing or approaching or overtaking or leading the host vehicle. The blind spot indicator or indicators may be located at other inboard portions or inward facing portions of the mirror casing, including a movable casing portion (such as a movable mirror portion or movable attachment portion or the like) and/or a fixed casing portion (such as a fixed mirror portion or fixed attachment portion or the like), so as to be viewable by the driver of the vehicle and not readily viewable by other road users or drivers of other vehicles, while remaining within the spirit and scope of the present invention.

Figure 13:
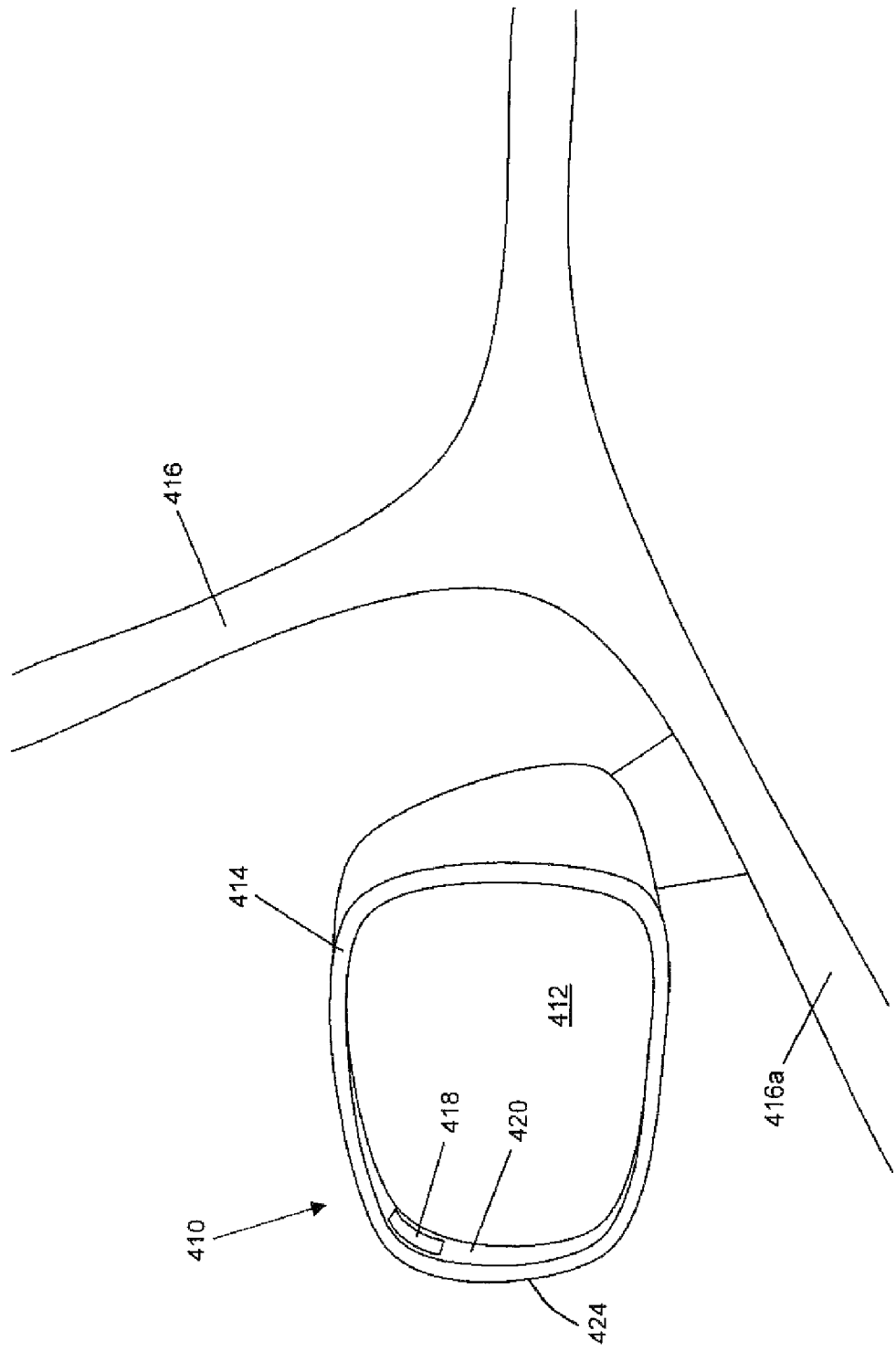
FIG. 13 is a perspective view of another exterior mirror assembly with a blind spot indicator in accordance with the present invention.
Figure 14:
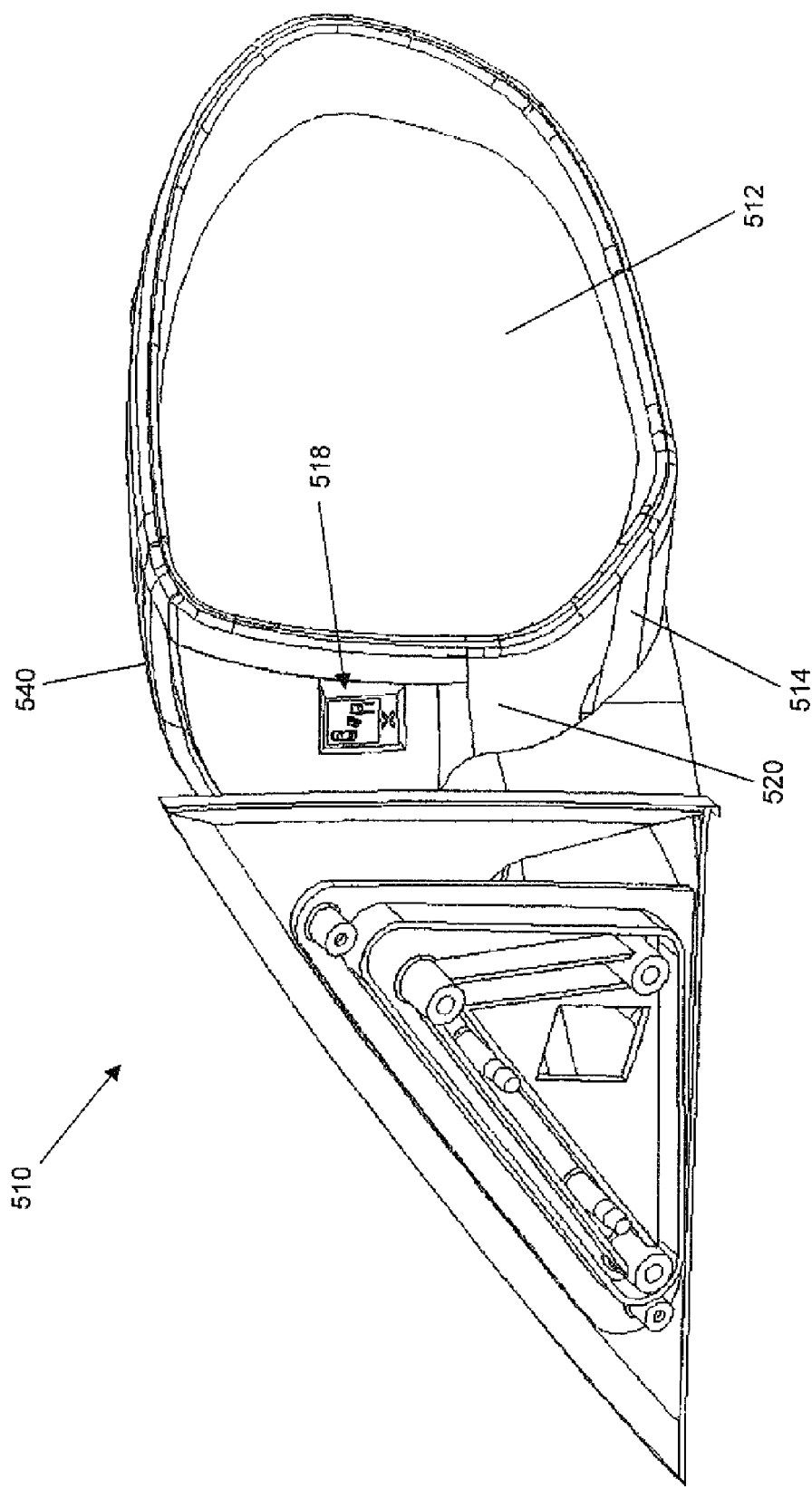
FIG. 14 is a perspective view of another exterior mirror assembly with a blind spot indicator module in accordance with the present invention.
Figure 15B:
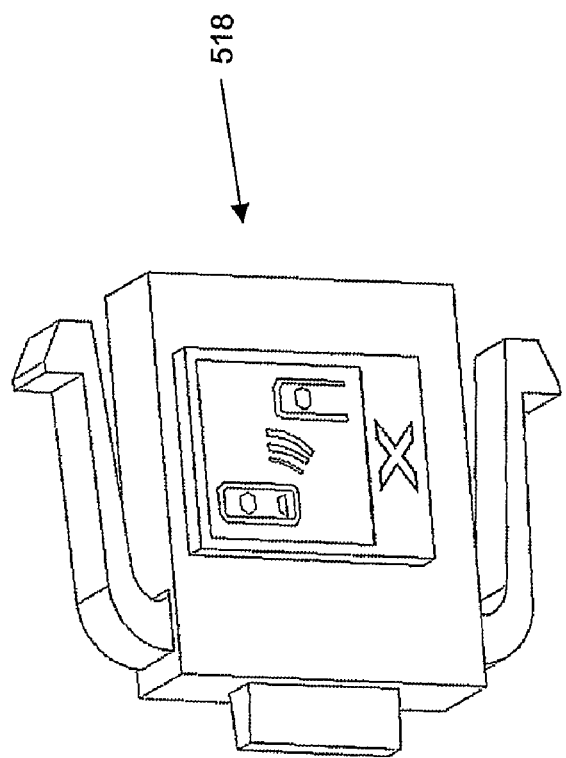
FIGS. 15A and B are perspective views of the blind spot indicator module of FIG. 14.
Figure 15A:
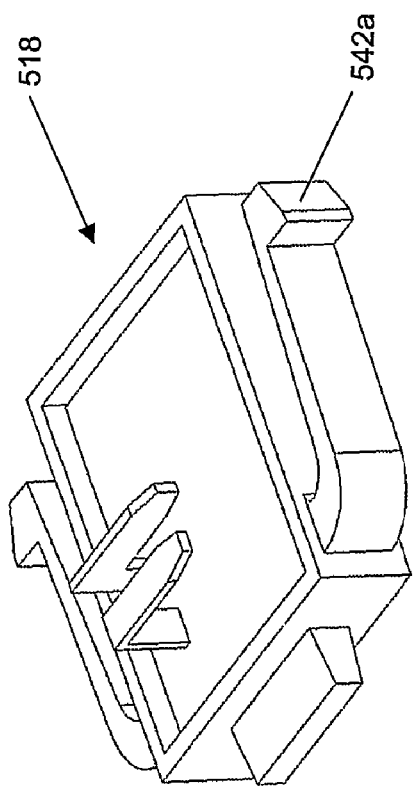
Figure 17:
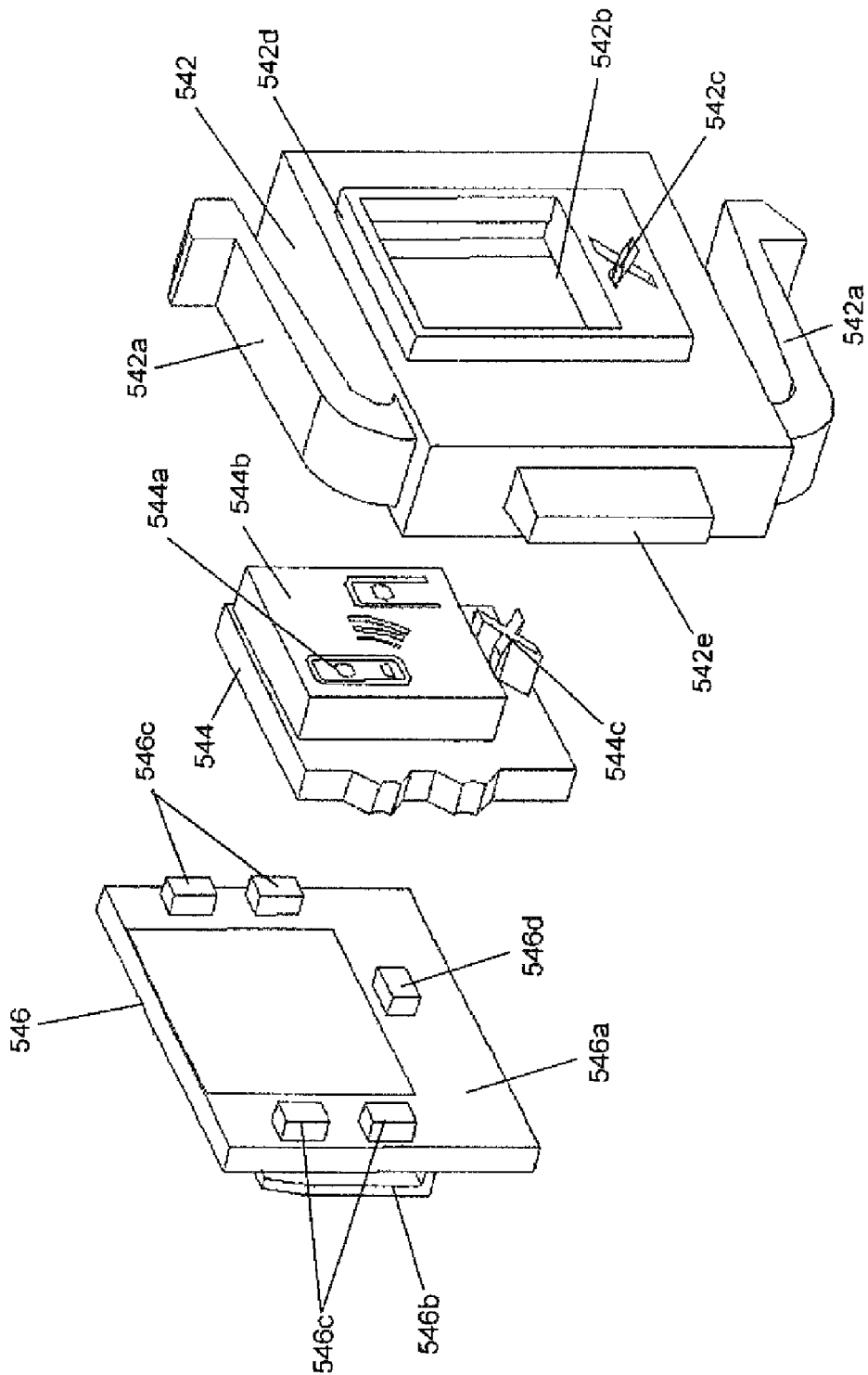
FIG. 17 is an exploded perspective view of the blind spot indicator module of FIGS. 14-16.

Optionally, and with reference to FIG. 13, an exterior rearview mirror assembly 410 for a vehicle includes a reflective element 412 and a mirror shell or casing 414. Mirror assembly 410 is mounted at the side 416a of a host or subject vehicle 416, and includes a blind spot indicator 418 at an inboard portion or surface 420 of an outer wall 424 of the mirror casing 414 of mirror assembly 410. The blind spot indicator 418 thus may be located at a cusp or inboard surface of the outer wall 424 of mirror casing 414 so as to be readily viewable by the driver of the host vehicle, while being substantially hidden or not viewable by the driver of another vehicle at or near or approaching the host vehicle. The blind spot indicator 418 thus is located at a region that is remote from the reflective element of the mirror assembly so as to limit or substantially preclude confusion between the blind spot indicator and any display or indicator (such as a turn signal display or the like) that is located at the reflective element of the mirror assembly (and thus that may be intended for viewing by the driver of another vehicle).

Optionally, the blind spot indicator or LCA indicator of the present invention may be provided as an indicator module that is a unitary module including an illumination source, electrical connectors and cover and/or light directing or guiding elements or means. The unitary indicator module is preferably sealed so as to be substantially impervious to water so as to provide a robust module that can withstand the exposure to the elements at the exterior rearview mirror assembly. The sealing means for sealing the module may comprise any suitable sealing means, such as sealing means that are known or conventional in the art, such as gasketing, welding, such as ultrasonic welding or the like, or adhering or any other suitable sealing means for sealing the module. The mirror assembly may be formed with a cavity or opening (such as at the inboard wall of the mirror housing that faces or opposes the vehicle) for receiving or attaching the unitary indicator module therein or thereat, and may include the electrical connectors at the cavity or opening for making the appropriate electrical connections to the indicator module. Optionally, the electrical connections may be made while the indicator module is attached to the mirror assembly, such as via a plug and socket type arrangement or configuration, and such as by utilizing aspects of the mirror assembly described in U.S. Pat. No. 6,669,267, which is hereby incorporated herein by reference in its entirety. The unitary indicator module may include or utilize aspects of various light modules or systems or devices, such as the types described in U.S. Pat. Nos. 6,227,689; 6,582,109; 5,371,659; 5,497,306; 5,669,699; 5,823,654; 6,176,602; and/or 6,276,821, which are hereby incorporated herein by reference in their entireties.

The unitary indicator module thus may be provided as a unitary element or unit and may be readily installed at an exterior mirror assembly to provide the blind spot/LCA indicator at the inboard wall or portion of the exterior mirror. The blind spot detection system (and thus the blind spot indicator) thus may be selected by a customer as an option for their vehicle, whereby the blind spot indicator unit or module or unitary module may be provided for the appropriate mirror assembly. Optionally, the exterior mirror assembly may be shipped to a vehicle assembly plant with the blind spot indicator module already installed, or the exterior mirror assembly may be shipped to the vehicle assembly plant with a socket or structure or receiving portion (such as at the inboard portion of the mirror assembly) for receiving or mounting or attaching the indicator module. The indicator module, when selected, may be connected or plugged in or otherwise attached to the mirror assembly at the socket or structure or receiving portion at the vehicle assembly plant, so as to be substantially flush with the outer surface of the mirror housing when so inserted or connected or plugged in or attached. Optionally, the indicator module may be slightly to moderately proud of the outer surface of the inboard portion of the mirror casing or housing when attached thereto, so as to be slightly protruding outward (generally toward the vehicle) from the inboard portion of the mirror casing or housing, such as less than about 1 mm to about 3 mm or thereabouts. The indicator module may make both the mechanical and electrical connections to the mirror assembly when attached thereto, such as by utilizing aspects described in U.S. Pat. No. 6,669,267, which is hereby incorporated herein by reference in its entirety. The indicator module thus may be installed at the appropriate mirror assembly (such as for a vehicle that has the blind spot indicator selected as an option) at the vehicle assembly plant, while a blank out panel or element or the like may be attached to the mirror assembly (such as by snapping or connecting or attaching a blank out panel or element at the receiving portion of the inboard portion of the mirror assembly) for vehicles that do not have the blind spot indicator option selected. Because the blind spot indicator and associated circuitry/electronics may be costly, the unitary indicator module allows the indicator to be added to the exterior mirror only for those vehicles with the indicator option selected, and without affecting the mirror assembly structure and design, so that a common mirror shell may be utilized for a standard mirror and for a mirror with the indicator option selected, thereby deproliferating parts and providing economies of scale for the mirror assemblies. An operator need only attach the selected or appropriate one of the blind spot indicator module or the blank out element at the receiving portion of the inboard portion of the mirror assembly.

For example, a method of supplying an exterior rearview mirror system for a vehicle includes providing mirror casings, with each mirror casing at least comprising a mirror portion including a reflective element. The reflective element is adjustably supportable by an actuator within the mirror portion of the mirror casing. Each of the mirror casings has an inboard portion that faces generally toward the exterior side of the vehicle and that is viewable by a driver of the vehicle when the exterior mirror assembly is mounted at the exterior side of the vehicle. At least some of the mirror casings are provided with an aperture or receiving portion established at the inboard portion. Blind spot indicator units are provided, with each of the blind spot indicator units comprising at least one indicating element and/or illumination source for indicating to the driver a detected presence of an object at least one of alongside and rearward of the vehicle. First mirror assemblies are established by disposing the blind spot indicator units at the apertures of the inboard portions of the at least some of the mirror casings and second mirror assemblies are established by providing mirror casings lacking an aperture established at the inboard portion. The blind spot indicator units are at least partially received at the apertures of the first mirror assemblies. The first mirror assemblies are supplied to a vehicle manufacturing facility when inclusion of a blind spot indicator is required and the second mirror assemblies are supplied to a vehicle manufacturing facility when inclusion of a blind spot indicator is not required.

Optionally, a method of manufacturing an exterior rearview mirror assembly includes providing an exterior mirror assembly having a reflective element and a mirror casing. The mirror casing is mountable at an exterior side of a vehicle and has an inboard portion that faces generally toward the exterior side of the vehicle and is viewable by a driver of the vehicle when the exterior mirror assembly is mounted at the exterior side of the vehicle. The inboard portions of at least some of the mirror casings have an aperture or receiving portion established thereat. The method includes providing a blind spot indicator having at least one illumination source for indicating to the driver a detected presence of an object alongside of and/or rearward of the vehicle. A blank element or blank out panel or element or cover portion or casing or cap portion that substantially corresponds with a surface of the inboard portion of the exterior rearview mirror assembly may also be provided (or some mirror casings may be provided without an aperture or receiving portion at the inboard portion). The method includes selecting a selected element, where the selected element is selected from a group consisting of (a) the blind spot indicator and (b) the blank element and (c) a mirror casing without an aperture or receiving portion at the inboard portion. The method may further include attaching the selected element at the inboard portion of the mirror assembly, whereby the selected element is at least partially received at the receiving portion, and an exterior surface of the selected element is substantially flush with a surface of the inboard portion. If the mirror assembly is targeted for installation on a vehicle without an optional side object detection system selected, then the operator may readily attach the blank out element at the receiving portion of the inboard portion of the mirror assembly instead of the indicator module. In applications where some of the mirror casings are not provided with an aperture or receiving portion, no cap or blank element is needed to provide the substantially flush inboard portion for applications where no side object detection system is selected. The mirror assembly thus is assembled and installed at the appropriate vehicle with the appropriate or selected features or content for that particular vehicle and selected option.

The method may include determining a desired optional content of each exterior rearview mirror assembly and selecting a selected element or mirror casing according to the determined desired optional content for each exterior rearview mirror assembly. The attaching of the selected element or use of the selected mirror casing preferably is made at the mirror manufacturer's facility, but could be made at a vehicle assembly plant (such as at a location or station of the vehicle assembly plant at or before the station where the mirror assembly is attached to the vehicle). The attaching of the selected element preferably also includes connecting the indicating element or illumination source of the blind spot indicator to an electrical connector. Preferably, the attaching of the selected element includes making both the mechanical and electrical connections for the indicator at the inboard portion of the mirror assembly.

Figure 18:
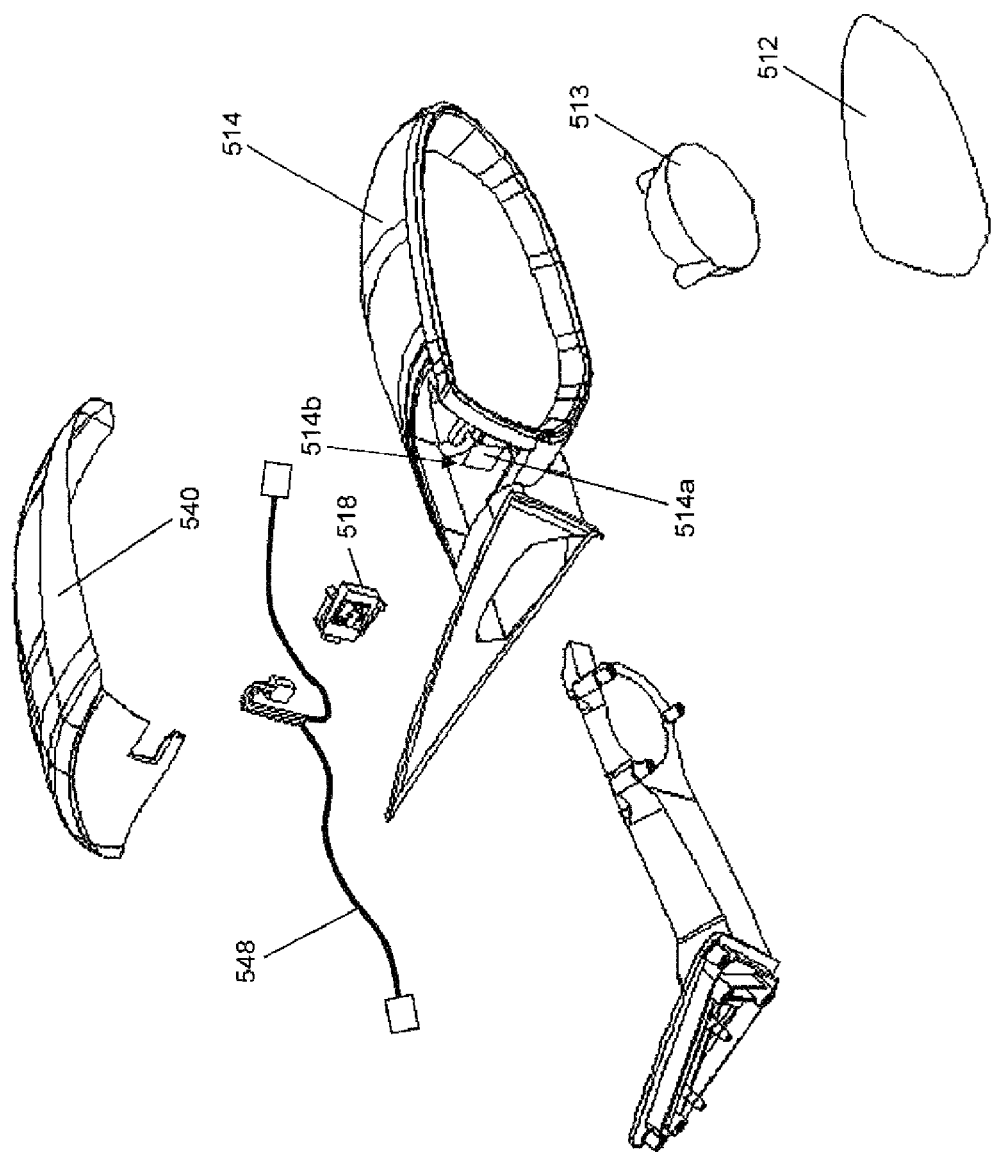
FIG. 18 is an exploded perspective view of the exterior mirror assembly of FIG. 14.

For example, and with reference to FIGS. 14-23, an exterior rearview mirror assembly 510 for a vehicle includes a reflective element 512 and a mirror shell or casing or housing 514. The reflective element 512 is movably supported at housing 514 via a mirror actuator 513 (FIG. 18). Mirror assembly 510 includes a blind spot indicator module 518 at an inboard portion or surface 520 of an inner wall 524 of the mirror housing 514 of mirror assembly 510. Blind spot indicator module 518 is mounted in an aperture 514b formed at the housing 514, and the mirror assembly 510 includes a back cap 540 that may substantially cover a portion of the housing 514, and may cover or surround a portion of the indicator module 518, as discussed below. As shown M FIGS. 15-17, blind spot indicator module 518 includes a housing 542, a lens element or optic element 544 and a printed circuit board or PCB assembly 546. The housing 542 includes mounting tabs 542a protruding therefrom for flexing as the module 518 is attached to a mounting portion 514a (FIGS. 18-22) of housing 514 and retaining the module 518 to the housing 514.

PCB assembly 546 includes a board or substrate 546a with an electrical connector or terminals 546b and a plurality of illumination sources disposed thereon, such as four amber light emitting diodes 546c and one red light emitting diode 546d. Electrical connectors 546b comprise conductive terminals protruding from an inner surface of the substrate 546a and are configured for connection to an electrical wiring or connector 548 (FIGS. 18-20) of the vehicle. The indicator module may be relatively small and readily attachable to the mirror assembly. For example, an exemplary embodiment of the module may be about 15 mm thick, and about 45 mm long and about 37 mm wide or thereabouts. However, other sized and/or shaped modules may be implemented while remaining within the spirit and scope of the present invention. The illumination sources or light emitting diodes (LEDs) 546c, 546d are disposed at an outer surface of the substrate 546a and emit light through lens element 544 when activated/energized.

Lens element 544 comprises a transparent or translucent element or block with graphics or icons or indicia 544a formed or established at a primary or principle viewing area 544b of the lens element. For example, the lens element may include vehicle icons established thereon so that a person viewing the module readily recognizes that the purpose of the indicator module is for a blind spot detection system, particularly when the illumination sources are not activated. The primary viewing area 544b of the lens element 544 may be generally aligned with the amber LEDs 546c and may be aligned with or at least partially protrude through an opening or aperture 542b through housing 542 so that the icons or indicia at the primary viewing area 544b are illuminated by the amber LEDs to alert the driver of a detection of an object in an adjacent lane. In the illustrated embodiment, the lens element 544 includes an alert indicating projection or element 544c in the form of an "X". The projection 544c is generally aligned with the red LED 546d of the PCB assembly 546 and is at least partially received through or aligned with a correspondingly formed or shaped aperture 542c in housing 542, such that red light emitted by the red LED is viewable as a red "X" to indicate to the driver of the vehicle that an object is detected (so as to alert the driver of the object and to indicate that the driver should not change lanes to that side).

Figure 19:
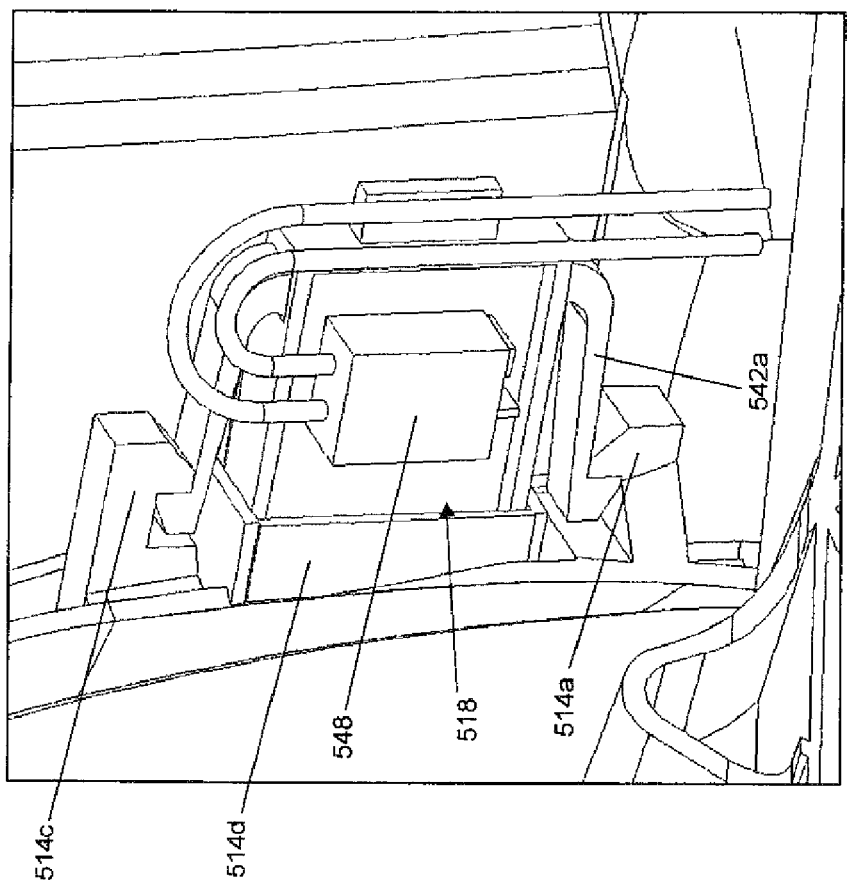
FIG. 19 is a perspective view of the blind spot indicator module as attached to the mirror housing.
Figure 20:
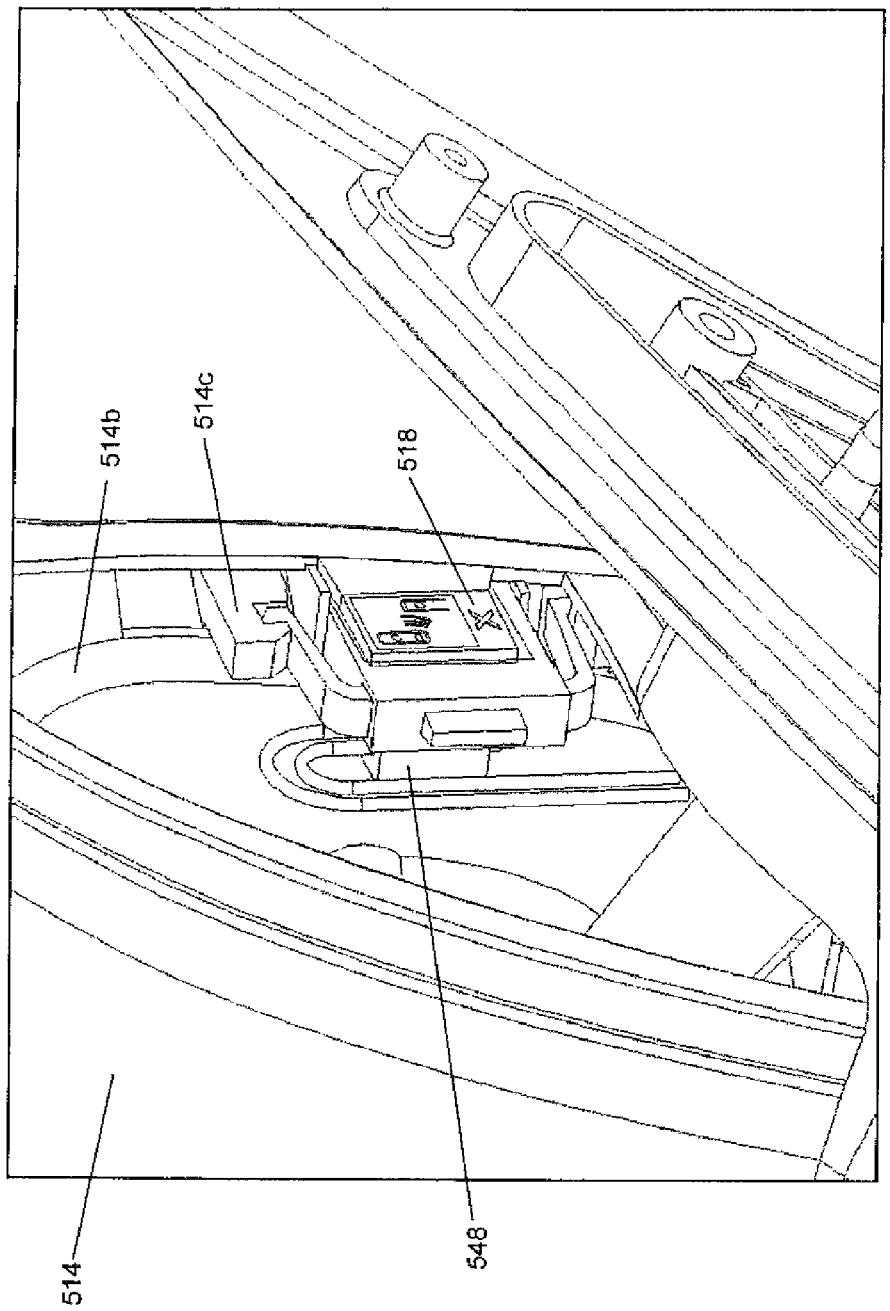
FIG. 20 is another perspective view of the blind spot indicator and mirror housing of FIG. 19.
Figure 22:
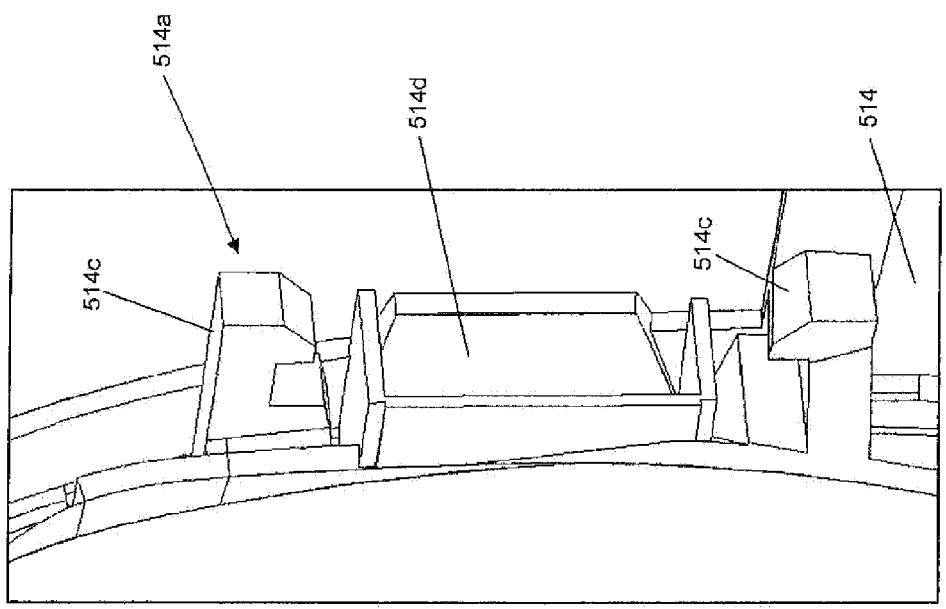
FIG. 22 is a perspective view of the mounting portion of the housing of the mirror assembly.

As shown in FIG. 18, housing 514 of mirror assembly 510 includes an aperture 514b formed at an inner wall or portion 520 of housing 514. The housing 514 includes a mounting portion 514a for indicator module 518. As shown in FIG. 22, mounting portion 514a includes a pair of tabs 514c that are formed to engage the arms 542a of housing 542 of indicator module 518 and a pocket or recess 514d for receiving a portion of housing 542 therein, in order to mount and retain indicator module 518 at housing 514 of mirror assembly. The pocket 514d receives an end portion of the indicator module housing to set and retain the indicator housing at a location such that the outer surface of the indicator module housing is substantially flush with the mirror housing. Indicator module 518 thus is attached to mounting portion 514a of mirror housing 514, and the wire harness and connector 548 may be readily connected to terminals 546b of indicator module 518, as shown in FIGS. 19 and 20, either before or after indicator module 518 is attached to the mounting portion 514a.

Figure 21:
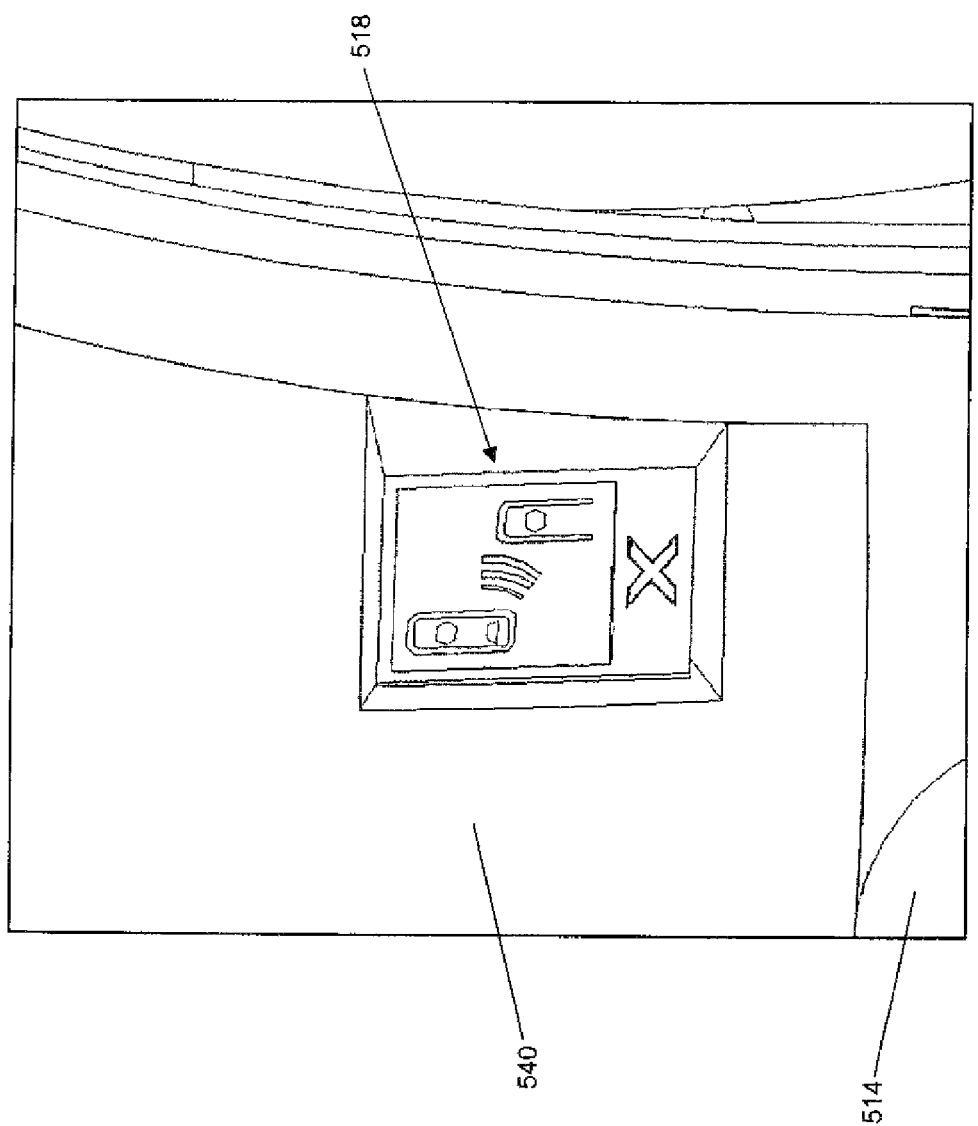
FIG. 21 is an enlarged perspective view of the blind spot indicator as mounted at the mirror assembly.
Figure 23:
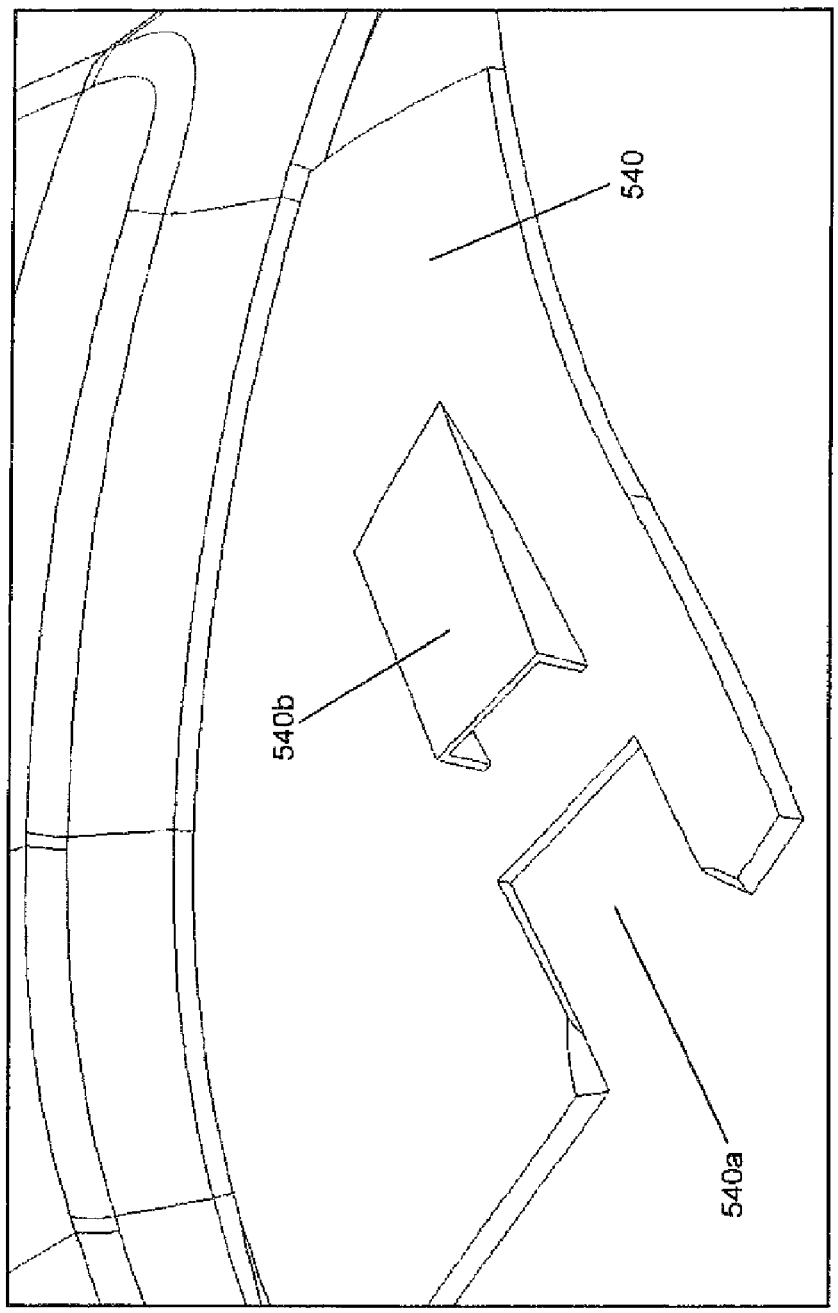
FIG. 23 is a perspective view of the back cap of the exterior mirror assembly of FIGS. 14 and 18.

After the electrical connection is made and after the indicator module is attached to the mounting portion 514a, the back cap 540 may be readily attached to the mirror housing 514 to substantially close the aperture 514b in mirror housing 514 and to cover a portion of and partially surround indicator module 18. As can be seen in FIGS. 20, 21 and 23, the housing 542 of indicator module 518 includes a raised portion 542d that protrudes slightly outward from the outer surface of the housing, and the back cap 540 is formed with a slot 540a that receives or partially surrounds the raised portion 542d at the inner side of the mirror assembly. The back cap 540 may include a pocket 540b for receiving a tab 542e of housing 542 when back cap 540 is attached to the mirror housing so as to set the back cap to be substantially flush with the outer surface of the indicator module when the back cap is attached to the mirror housing and partially surrounds the indicator module. As shown in FIG. 23, the edges of the slot 540a may be tapered or otherwise formed to engage the edges of the raised portion 542d and the thickness of the back cap 540 and the height of the raised portion 542d are selected to be substantially similar so that the back cap 540 and outer surface of the raised portion 542d provide a substantially flush surface at the inner side of the mirror assembly. Optionally, other means for retaining or connecting the back cap to the indicator module in a flush manner may be implemented, such as a tongue and groove configuration or the like.

Optionally, if the indicator module is not selected for the mirror assembly, a blank out element or cover element may be provided at the receiving portion (and may snap into the receiving portion in a similar manner as the indicator module as described above) or the back cap or cover element may include a portion that extends over the receiving portion so as to substantially cover/conceal the receiving portion when an indicator module is not installed thereat, or the mirror casing may be provided without an aperture or receiving portion at the inboard portion. Thus, the inboard portion of a mirror casing that does not include a blind spot indicator module may have a substantially flush or continuous or un-interrupted surface due to the absence of or lacking of an aperture or receiving portion or module thereat.

Optionally, and with reference to FIGS. 24-27B, an exterior rearview mirror assembly 510' for a vehicle includes a reflective element 512' and a mirror shell or casing or housing 514'. Mirror assembly 510' includes a blind spot indicator module 518' at an inboard portion or surface 520' of an inner wall 524' of the mirror housing 514' of mirror assembly 510'. Blind spot indicator module 518' is mounted in an aperture 514b' formed at the housing 514', and the mirror assembly 510' includes a back cap 540' that may substantially cover a portion of the housing 514', and may cover or close or substantially seal an aperture 514c' of housing 514', such as described above. Blind spot indicator module 518' may be substantially similar to blind spot indicator module 518, discussed above, and includes a housing 542', a lens element or optic element 544' (such as a clear lens with graphics, such as an ISO icon and/or diffusion and/or the like, and a hardcoat or the like), a printed circuit board or PCB assembly 546' (which may include multiple LEDs or the like, and may comprise a slave design with minimal current control), a potting element 549' at the PCT assembly and housing (such as a black potting element or material or the like) and a gasket 547' (such as a die-cut foam or other suitable gasket material). Because blind spot indicator module 518' may be substantially similar to blind spot indicator module 518, discussed above, a detailed discussion of the blind spot indicator modules will not be repeated herein. The indicator module may be generally square-shaped and relatively small and readily attachable to the mirror assembly. For example, an exemplary embodiment of the module may be about 15 mm thick, and about 37 mm long and about 37 mm wide or thereabouts. However, other sized and/or shaped modules may be implemented while remaining within the spirit and scope of the present invention.

Figure 24:
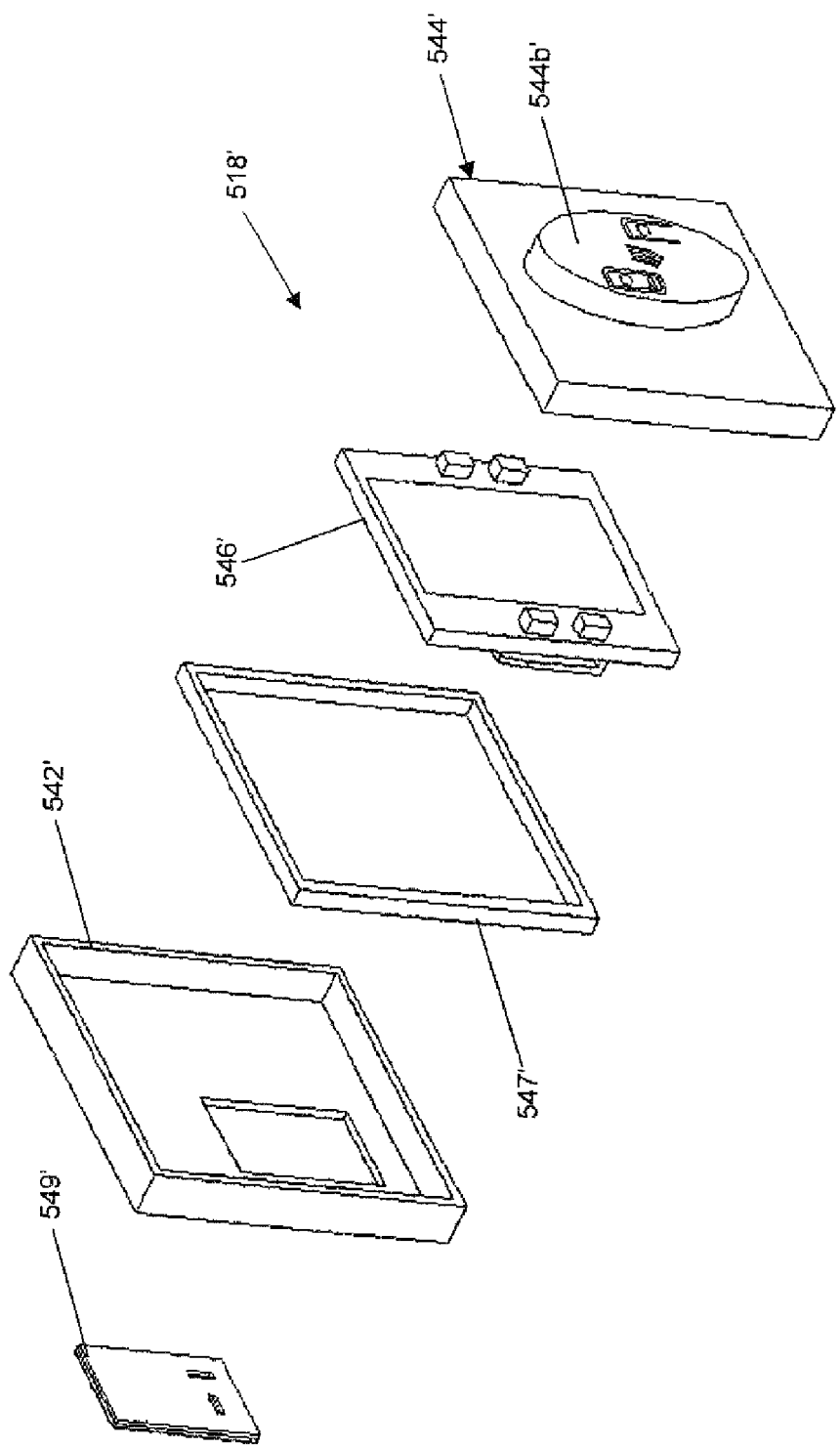
FIG. 24 is an exploded perspective view of another blind spot indicator module in accordance with the present invention.
Figure 26:
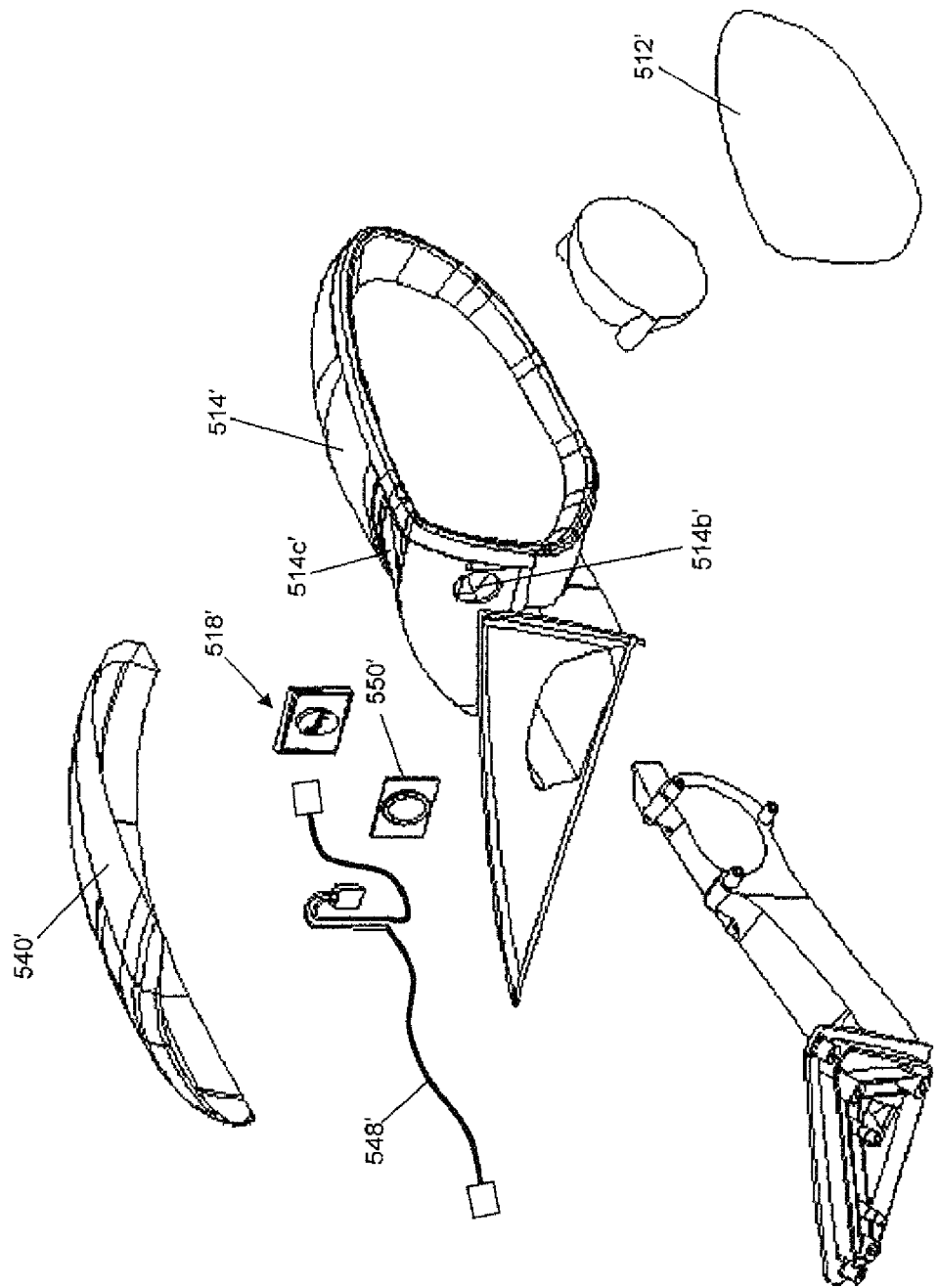
FIG. 26 is an exploded perspective view of an exterior mirror assembly and the blind spot indicator module in accordance with the present invention.
Figure 28:
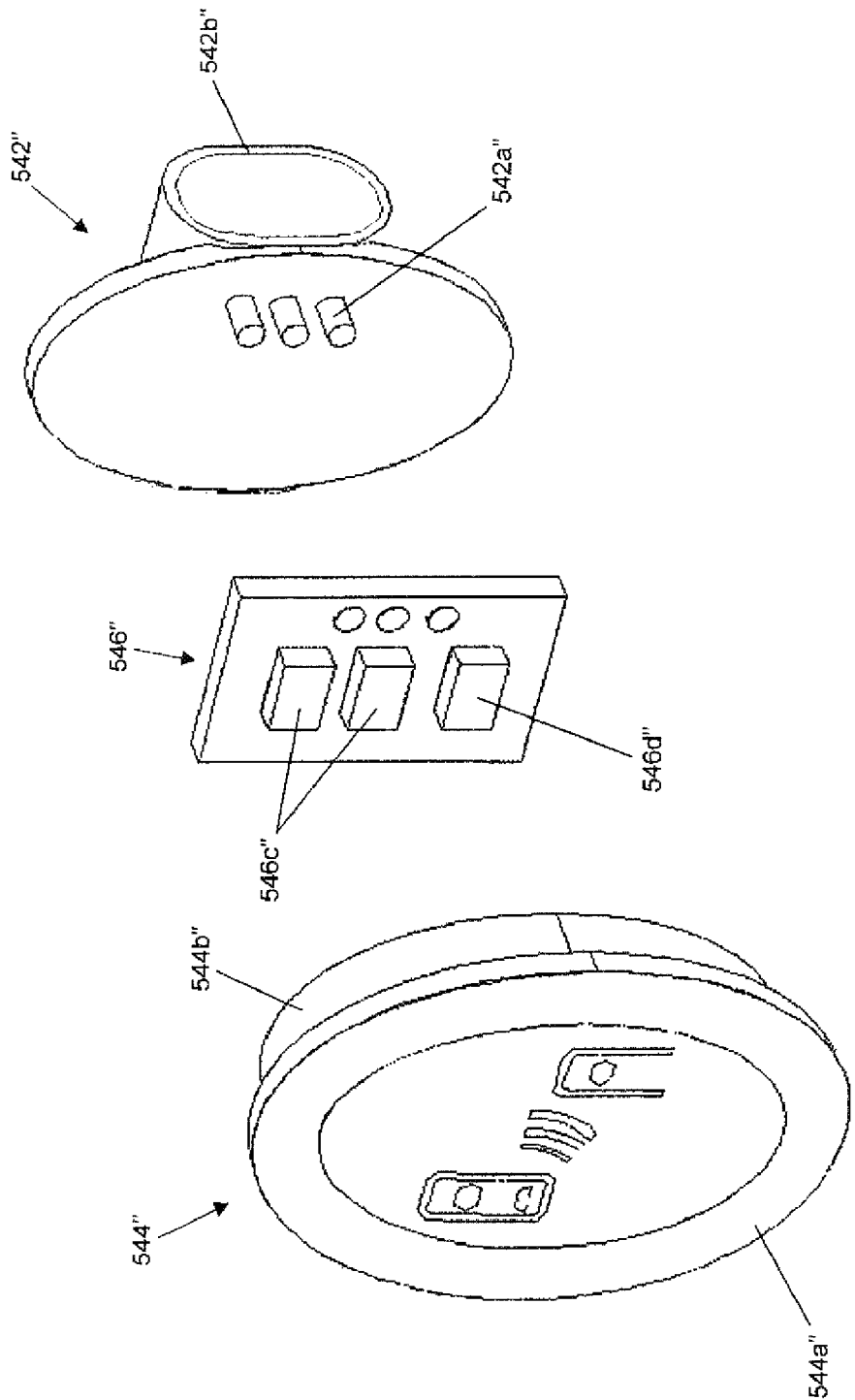
FIG. 28 is an exploded perspective view of another blind spot indicator module in accordance with the present invention.

As can be seen in FIG. 24, lens element 544' blind spot indicator module 518' includes a raised portion 544b' that protrudes outward from the outer surface of the housing 542' when lens element is received therein (as can be seen in FIGS. 25A and 25B), and the aperture 514b' in mirror housing 514' is formed to at least partially receive the raised portion 544b' therethrough when the indicator module 518' is mounted at the inner side of the mirror housing 514'. As shown in FIG. 26, a cover element or close-out element 550' may be provided at the indicator module 518' to provide a custom, flush close-out (such as a close-out element having a clear or transparent or translucent center region and an opaque or dark colored outer region) at and around the raised portion 544b' and at the aperture 514b' of the mirror housing 514'.

The mirror housing 514' includes a second aperture 514c' to facilitate insertion of and mounting of the indicator module at the aperture 514b' from outside the mirror assembly 510'.

The back cap 540' may be attached to the mirror housing 514' to substantially close and seal the aperture 514c' after the indicator module 518' is mounted at the inner side of the mirror housing 514' (and after the electrical connection of the indicator module terminals 546b' to the wire harness 548 is made). The raised portion 544b' is received into the close-out element 550' and the outer surfaces of the close-out element and of the raised portion 544b' of the indicator module are substantially flush with the inward facing surface of the inner side of the mirror housing 514' so as to provide a substantially flush surface at the inner side of the mirror assembly.

Optionally, and with reference to FIGS. 28-31B, an exterior rearview mirror assembly 510" for a vehicle includes a reflective element 512" and a mirror shell or casing or housing 514". Mirror assembly 510" includes a blind spot indicator module 518" at an inboard portion or surface 520" of an inner wall 524" of the mirror housing 514" of mirror assembly 510". Blind spot indicator module 518" is mounted in an aperture 514b" formed at the housing 514", and the mirror assembly 510" includes a back cap 540" that may substantially cover a portion of the housing 514", and may cover or close or substantially seal an aperture 514c" of housing 514", such as described above. Blind spot indicator module 518" may be substantially similar to blind spot indicator modules 518, 518', discussed above, and includes a housing or backplate 542" (which may include insert molded water proof connectors or the like), a lens element or close-out element 544", and a printed circuit board or PCB assembly 546". Because blind spot indicator module 518" may be substantially similar to blind spot indicator modules 518, 518", discussed above, a detailed discussion of the blind spot indicator modules will not be repeated herein. The indicator module may be relatively small and readily attachable to the mirror assembly. For example, an exemplary embodiment of the module may be about 15 mm thick, and about 33 mm long and about 23 mm wide or thereabouts. However, other sized and/or shaped modules may be implemented while remaining within the spirit and scope of the present invention.

The backplate 542" includes electrically conductive terminals 542a" that terminate at a connector 542b" for electrically connecting the indicator module 518" to an electrical wire or connector 548" of the vehicle. The terminals 542a" connect to the PCB assembly 546" to electrically power or energize the illumination sources (such as two amber LEDs 546c" and one red LED 546d") established thereon (other circuitry, such as resistors and diodes and the like may also be established on the PCB assembly without affecting the scope of the present invention). The close-out element 544" may comprise any suitable material to provide the desired appearance of the indicator module. For example, the close-out element 544" may comprise an insert molded film with a 3M light control film (such as the types described in U.S. provisional application Ser. No. 60/783,496, filed Mar. 18, 2006; and International PCT Application No. PCT/US2006/18567, filed May 15, 2006 by Donnelly Corp. for VEHICLE MIRROR ASSEMBLY WITH INDICIA AT REFLECTIVE ELEMENT, and published Nov. 23, 2006 as International Publication No. WO 2006/124682, which are hereby incorporated herein by reference in their entireties), and may have a hard coat, graphics and/or diffusing element established thereon or thereat.

Figure 29A:
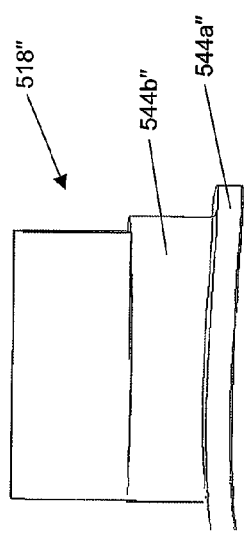
FIGS. 29A-C are plan views of the blind spot indicator module of FIG. 28.
Figure 29C:
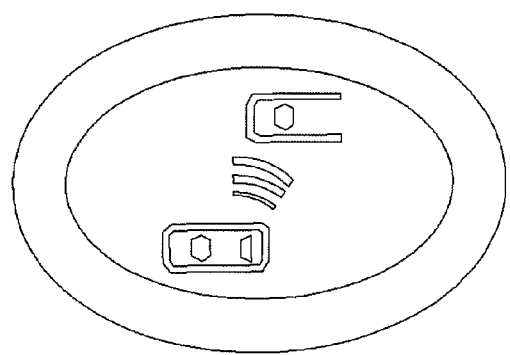
Figure 29B:
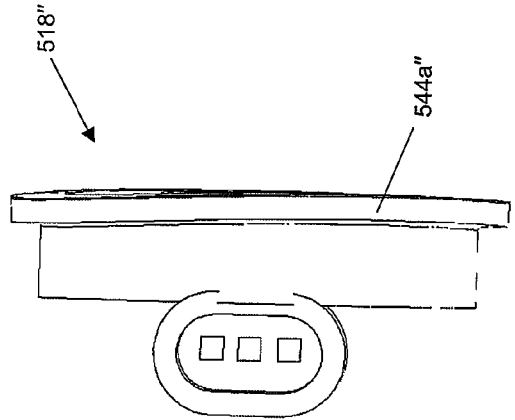
Figure 30:
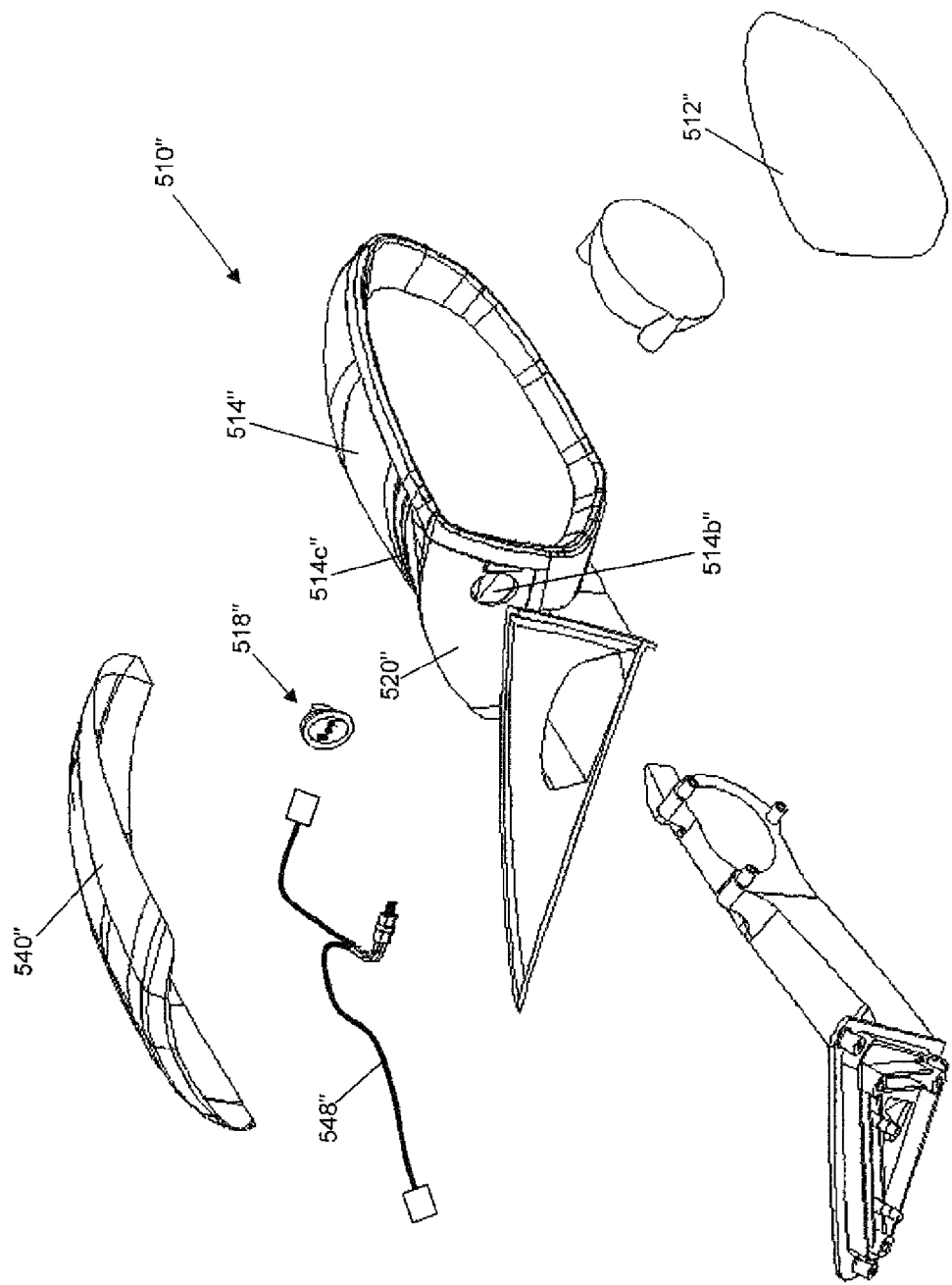
FIG. 30 is an exploded perspective view of an exterior mirror assembly and the blind spot indicator module in accordance with the present invention.
Figure 31A:
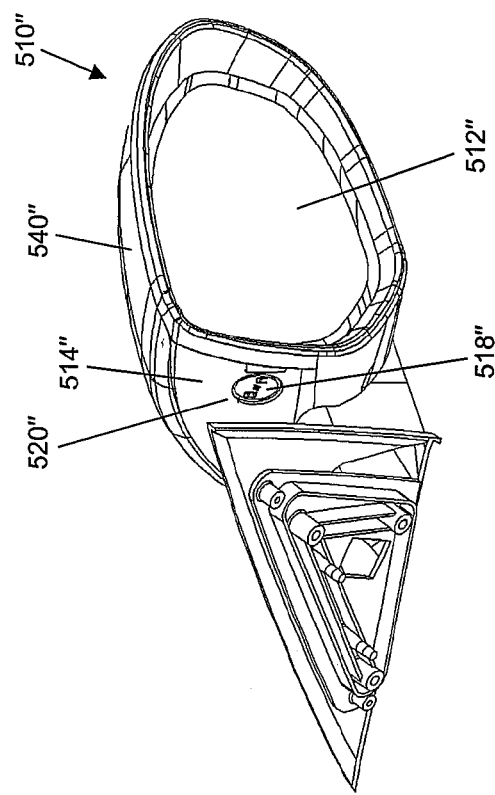
FIGS. 31A and 31B are perspective views of the exterior mirror assembly and blind spot indicator module of FIG. 30.
Figure 31B:
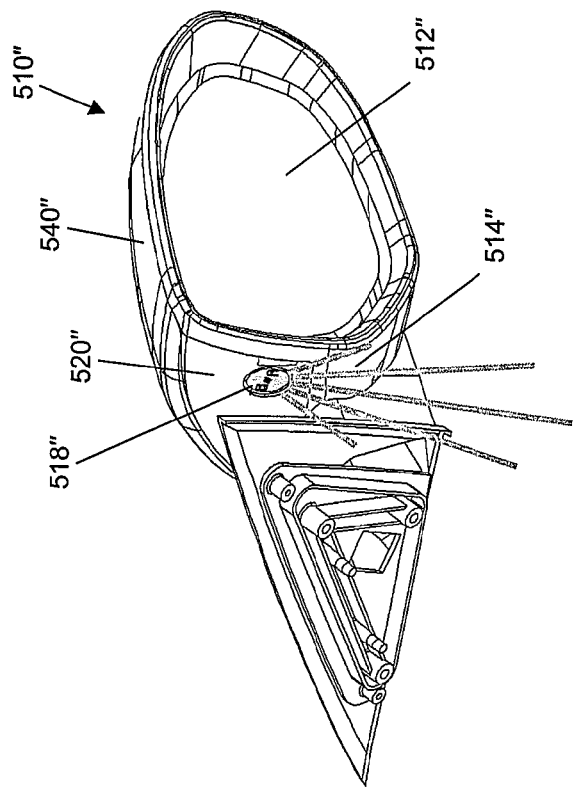

As can be seen in FIGS. 29A and 29B, the close-out element 544" includes an outer portion 544a" that has a larger perimeter than an inner portion 544b" of the element 544". The outer portion may be countersunk or received in a recess formed in the mirror housing 514" and at the aperture 514b", so that the outer surface of the outer portion 544a" is substantially flush with the outer surface of the inner side of the mirror housing 514" when the indicator module 518" is mounted to the mirror housing 514". The indicator module 518" thus may be inserted or plugged into the mirror housing from the outside and the electrical connection may be made before the module is plugged in or after (such as by reaching through another aperture 514c" in the housing 514"), whereby the outer surface of the indicator module is substantially flush with the outer surface of the mirror housing. The cover or back cap 540" may be attached to the mirror housing to cover and/or close/seal the aperture 514c" at the housing.

Therefore, the blind spot indicator module of the present invention may comprise a "plug-in" module that may be readily installed and connected to the mirror housing and electrical wiring from the outside of the mirror assembly. The indicator module is countersunk into an aperture in the mirror housing so that the outer surfaces of the indicator module and the mirror housing end up being substantially flush with one another so as to preserve the vehicle styling and aerodynamic streamlining of the vehicle, and thus limit or substantially preclude creating any wind noise. Also, because the outer surfaces are substantially flush, the indicator module limits or avoids providing a site where frost, debris or snow may gather.

The indicator module may thus be readily installed and connected at a mirror assembly and the back cap or cover may be attached to the mirror housing to substantially close or seal the aperture or apertures at which the indicator module is installed. The cap or cover thus closes the mirror housing and may also provide the desired exterior surface or styling for the particular vehicle at which the mirror assembly is attached. The mirror assembly thus may be shipped with or without the indicator module, whereby the indicator module may be readily installed to the mirror assembly by an operator at the mirror manufacturer or at the vehicle assembly plant or facility.

The indicator module may provide a standard or substantially universal module that establishes a seal at the aperture with the desired lighting and indicia for the blind spot detection system. The indicator module may provide a desired lighting and may direct or guide or control the light in a desired direction. The cover or close-out element or custom lens may be customized for the particular vehicle application, and may provide a desired or selected appearance for the indicator depending on the particular vehicle application. For example, the custom lens or close-out element may have an optical element (such as to transmit light in a desired manner or direction) or other indicial or characteristics depending on the desired appearance and/or affect of the element that is desired by the vehicle or mirror manufacturer.

The blind spot indicator module may include indicia or icons at the lens element so that a person viewing the indicator module may readily discern the function of the module. During operation, the driver need not recognize the icons, but only needs to recognize or discern that the amber or red illumination sources are activated. However, when the module is not activated and a person is viewing the mirror assembly, the icons or indicia indicate the function of the indicator module so a person viewing the mirror assembly recognizes that the module is associated with a blind spot detection system. The icons thus are preferably established at the surface of the lens element of the indicator module, such as by stenciling, printing, or the like (or by providing optical facets or the like) so as to convey to the consumer/viewer what the indicator module is for when it is not in use. The indicator module or unit (or cover or lens thereof) thus may include or provide an icon or iconistic display that is indicative of the function of the indicator module, and that is discernible by the driver of the vehicle even when the icon or icons are not illuminated by the illumination source or illumination sources.

Desirably, the principal light radiating axis of the indicator module or unit coincides generally with a line drawn between the indicator module and the center of an eye ellipse of a driver sitting with the driver seat of the vehicle set at a standard position for that vehicle model and such as is known in the automotive arts. Such a line angle may be established by the structure (such as by molding or the like of the structure) of the indicator module housing and/or lens element or by the mirror housing itself, or the line angle may established by how the indicator module is received in the mounting area of the mirror housing, or by any other suitable means. The angling or direction of the indicator module thus may be set via the mirror housing or the indicator module itself, and may be set according to the vehicle line or application and according to which side of the vehicle the indicator module is mounted.

The blind spot indicator or indicator module of the present invention thus is positioned at the inboard portion of the exterior mirror and thus is positioned at an area that is readily viewable by the driver of the host vehicle. Because an exterior rearview mirror for a vehicle is formed to be angled for aerodynamic and aesthetic purposes, the exterior rearview mirror typically has an inboard portion or wall of the casing that is contoured or formed to be sloping outwardly and away from the vehicle, so as to provide a wall that is generally facing toward the driver of the vehicle so that the portion is readily viewable by the driver of the vehicle. This outwardly sloping portion or wall provides a location for the blind spot/LCA indicator of the present invention, where the indicator is readily viewable by the driver of the host vehicle, but is substantially hidden from the view of drivers of other vehicles at or near the host vehicle. Since the inboard wall or side or portion is not a primary viewing area, the blind spot indicator may be located at this portion without adversely affecting the styling lines and appearance of the mirror assembly. Optionally, a cowling or cover element or dome element or baffle or louver or the like may be provided at the mirror shell or support arm to further restrict the view of the indicator by drivers of other vehicles.

Typically, the mirror reflective element is recessed slightly within the cavity of the mirror shell, and it is not uncommon to have water beads, dirt, ice and the like build up in that area, since that area is sheltered from and is not directly exposed to the wind or slip stream as the vehicle travels along the road. By placing the indicator at the inboard wall or portion of the exterior mirror, the indicator is located in the slip stream and thus is exposed to the wind as the vehicle travels along the road. The blind spot indicator thus may be more visible to the driver of the host vehicle, since ice build up and/or debris build up is less likely in this area and since any water or ice or dirt or other debris or contaminants are often blown away from where the indicator is located, thus enhancing its visibility to the driver. Also, because the blind spot indicator is closer to the window (through which the driver views the indicator), the indicator is more readily viewable in fog or hazy conditions or other extreme weather conditions, such as during a snow storm or rain storm or the like, even if the driver cannot readily view the mirror reflective element of the exterior mirror.

The blind spot indicator thus is positioned at a location that is closer than conventional or known external indicators (which are typically located at the outboard upper corner of the reflective element) may be seen and discerned by the driver of the host vehicle even when the driver is not viewing the reflective element of the exterior rearview mirror. Because the blind spot indicator is located at the side or inboard portion of the mirror assembly or casing, the blind spot indicator may be relatively large (such as compared to indicators at the reflective element) to enhance viewing of the indicator, since the size of the indicator is not limited by the viewing requirements at the reflective element. For example, the blind spot indicator of the present invention may provide a viewing area dimension of preferably at least about one square centimeter, and more preferably at least about two square centimeters, and more preferably at least about four square centimeters. The size of the blind spot indicator thus may be selected to provide a desired viewing area, and is less fettered by the design constraints and regulations of the exterior mirror.

The blind spot indicator thus may be sized to provide the desired appearance and viewability/discernibility and may be positioned at the inboard portion in a manner that does not interfere with the movable parts of the exterior mirror assembly. Also, by locating the blind spot indicator at the inboard portion of the exterior rearview minor assembly, the indicator is naturally occluded by the exterior mirror from the view of the driver of another vehicle or any other person outside of the host vehicle. The blind spot indicator of the present invention thus may be provided at the desired size, shape and location, and thus provides the potential for enhanced flexibility in the design and implementation of the blind spot indicator, since the size, shape and design of the indicator is not constrained by the regulations and limitations otherwise applicable at the reflective element of the exterior mirror.

The blind spot indicator preferably is fixedly positioned at the inboard portion of the mirror assembly (such as substantially within the mirror shell or casing and visible at the inner or inboard shell wall at or near or adjacent to the driver side or passenger side front window, depending on whether it is a driver side or pass side mirror). However, it is envisioned that the blind spot indicator may be adjustable (such as via a user input within the vehicle cabin) to direct the indicator toward the particular driver's head area. The indicator may be adjusted by the driver of the host vehicle to enhance viewing of the indicator by the driver. The indicator may be adjusted separately from any adjustment of the reflective element so that the indicator may be adjusted toward the driver's head area and irrespective of the desired adjustment of the reflective element of the exterior rearview mirror. The indicator and any adjustment or alignment thereof may utilize aspects of the alignment device described in U.S. Pat. No. 6,598,982, which is hereby incorporated herein by reference in its entirety.

The blind spot indicator thus is operable to provide an indication to the driver of the host vehicle that an object or other vehicle has been detected in the lane or area adjacent to the side of the host vehicle. The blind spot indicator may be operable in association with a blind spot detection system, which may include an imaging sensor or sensors, or ultrasonic sensor or sensors, or sonar sensor or sensors or the like. For example, the blind spot detection system may utilize aspects of the blind spot detection and/or imaging systems described in U.S. Pat. Nos. 6,882,287; 6,198,409; 5,929,786; and/or 5,786,772, and/or U.S. patent application Ser. No. 10/427,051, filed Apr. 30, 2003 by Pawlicki et al. for OBJECT DETECTION SYSTEM FOR VEHICLE, now U.S. Pat. No. 7,038,577; Ser. No. 11/315,675, filed Dec. 22, 2005, now U.S. Pat. No. 7,720,580; and/or Ser. No. 11/239,980, filed Sep. 30, 2005, and/or U.S. provisional applications, Ser. No. 60/717,093, filed Sep. 14, 2005 by Lynam for DISPLAY DEVICE FOR EXTERIOR REARVIEW MIRROR; Ser. No. 60/638,687, filed Dec. 23, 2004 by Higgins-Luthman for OBJECT DETECTION SYSTEM FOR VEHICLE; Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; and/or Ser. No. 60/618,686, filed Oct. 14, 2004 by Laubinger for VEHICLE IMAGING SYSTEM, and/or of the reverse or backup aid systems, such as the rearwardly directed vehicle vision systems described in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003 by McMahon et al. for VEHICLE IMAGING SYSTEM, now U.S. Pat. No. 7,005,974, and/or of the automatic headlamp controls described in U.S. Pat. Nos. 5,796,094 and/or 5,715,093; and/or U.S. patent application Ser. No. 11/105,757, filed Apr. 14, 2005 by Schofield et al. for IMAGING SYSTEM FOR VEHICLE, now U.S. Pat. No. 7,526,103; and/or U.S. provisional application Ser. No. 60/607,963, filed Sep. 8, 2004 by Schofield for IMAGING SYSTEM FOR VEHICLE, and/or of the rain sensors described in U.S. Pat. Nos. 6,250,148 and 6,341,523, and/or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; and/or Ser. No. 10/534,632, filed May 11, 2005, and/or PCT Application No. PCT/US2003/036177 filed Nov. 14, 2003, published Jun. 3, 2004 as PCT Publication No. WO 2004/047421 A3, with all of the above referenced U.S. patents, patent applications and provisional applications and PCT applications being commonly assigned and being hereby incorporated herein by reference in their entireties.

Optionally, the indicator of the present invention may alert the driver of the host vehicle of other situations or status or the like. For example, the indicator could function to alert the driver of the host vehicle that the brake lights of the host vehicle are functioning properly. Other applications or uses of the indicator may be implemented, without affecting the scope of the present invention.

The reflective element of the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; and/or 4,712,879, and/or U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004, now U.S. Pat. No. 7,255,451; and/or Ser. No. 11/226,628, filed Sep. 14, 2005, and/or U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; and Ser. No. 60/774,449, filed Feb. 17, 2006; Ser. No. 60/783,496, filed Mar. 18, 2006; and/or Ser. No. 60/692,113, filed Jun. 20, 2005; and/or International PCT Application No. PCT/US2006/18567, filed May 15, 2006 by Donnelly Corp. for VEHICLE MIRROR ASSEMBLY WITH INDICIA AT REFLECTIVE ELEMENT, and published Nov. 23, 2006 as International Publication No. WO 2006/124682, which are all hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated herein by reference in their entireties. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and/or such as described in U.S. Pat. Nos. 5,910,854 and 6,420,036, and in PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, and U.S. patent application Ser. No. 10/528,269, filed Mar. 17, 2005, and published Mar. 9, 2006 as U.S. Patent Publication No. US-2006-0050356-A1, now U.S. Pat. No. 7,274,501, which are all hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the reflective element may include a perimeter metallic band, such as the types described in PCT Application No. PCT/US03/29776, filed Sep. 19, 2003 by Donnelly Corp. et al. for ELECTROCHROMIC MIRROR ASSEMBLY, and published Apr. 1, 2004 as International Publication No. WO 2004/026633; and/or PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or U.S. patent application Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, and published Mar. 9, 2006 as U.S. Patent Publication No. US-2006-0050356-A1, now U.S. Pat. No. 7,274,501; Ser. No. 10/533,762, filed May 4, 2005, now U.S. Pat. No. 7,184,190; and/or Ser. No. 11/226,628, filed Sep. 14, 2005; and/or U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004, which are hereby incorporated herein by reference in their entireties.

Optionally, the reflective element may include indicia formed at and viewable at the reflective element, such as by utilizing aspects of the reflective elements described in U.S. provisional applications, Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; Ser. No. 60/750,199, filed Dec. 14, 2005; and Ser. No. 60/774,449, filed Feb. 17, 2006; Ser. No. 60/783,496, filed Mar. 18, 2006, and International PCT Application No. PCT/US2006/18567, filed May 15, 2006 by Donnelly Corp. for VEHICLE MIRROR ASSEMBLY WITH INDICIA AT REFLECTIVE ELEMENT, and published Nov. 23, 2006 as International Publication No. WO 2006/124682, which are all hereby incorporated herein by reference in their entireties.

Although shown and described as an electro-optic or electrochromic reflective element assembly or cell, the reflective element may comprise a single substrate with a reflective coating at its rear surface, without affecting the scope of the present invention. The mirror assembly thus may comprise a prismatic mirror assembly or other mirror having a single substrate reflective element, such as a mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE, and published Dec. 2, 2004 as International Publication No. WO 2004/103772; and U.S. patent application Ser. No. 10/933,842, filed Sep. 3, 2004, now U.S. Pat. No. 7,249,860; and/or Ser. No. 10/556,754, filed Nov. 15, 2005, now U.S. Pat. No. 7,289,037, which are hereby incorporated herein by reference in their entireties. Optionally, the reflective element may comprise a conventional prismatic or flat reflective element or prism, or may comprise a prismatic or flat reflective element of the types described in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; U.S. patent application Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; Ser. No. 10/556,754, filed Nov. 15, 2005, now U.S. Pat. No. 7,289,037; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, and published Dec. 2, 2004 as International Publication No. WO 2004/103772, which are all hereby incorporated herein by reference in their entireties, without affecting the scope of the present invention.

Optionally, the mirror assembly may include one or more displays, such as the types disclosed in U.S. Pat. Nos. 5,530,240 and/or 6,329,925, which are hereby incorporated herein by reference in their entireties, and/or display-on-demand or transflective type displays, such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al, for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633; and/or PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or U.S. provisional applications, Ser. No. 60/630,061, filed Nov. 22, 2004 by Lynam et al. for MIRROR ASSEMBLY WITH VIDEO DISPLAY; Ser. No. 60/667,048, filed Mar. 31, 2005 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; and Ser. No. 60/563,342, filed Apr. 19, 2004, and/or PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, which are all hereby incorporated herein by reference in their entireties, or may include or incorporate video displays or the like, such as the types described in PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, and/or U.S. patent application Ser. No. 10/538,724, filed Jun. 13, 2005 by Hutzel et al. for ACCESSORY SYSTEM FOR VEHICLE; and/or Ser. No. 11/284,543, filed Nov. 22, 2005, now U.S. Pat. No. 7,370,983, and/or U.S. provisional applications, Ser. No. 60/630,061, filed Nov. 22, 2004 by Lynam et al. for MIRROR ASSEMBLY WITH VIDEO DISPLAY; and Ser. No. 60/667,048, filed Mar. 31, 2005 by Lynam et al. for MIRROR ASSEMBLY WITH VIDEO DISPLAY, which are hereby incorporated herein by reference in their entireties.

Optionally, the mirror assembly may include an imaging device, such as an imaging array sensor for imaging systems of the types described in U.S. Pat. Nos. 6,757,109; 6,717,610; 6,396,397; 6,201,642; 6,353,392; 6,313,454; 6,396,397; 5,550,677; 5,670,935; 5,796,094; 5,877,897; 6,097,023; and 6,498,620, and U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149, and Ser. No. 10/427,051, filed Apr. 30, 2003 by Pawlicki et al. for OBJECT DETECTION SYSTEM FOR VEHICLE, now U.S. Pat. No. 7,038,577, which are all hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. An exterior rearview mirror system for a vehicle, said exterior rearview mirror system comprising:

an exterior rearview mirror assembly configured for attaching to an exterior side of a vehicle equipped with said exterior rearview mirror system, said exterior rearview mirror assembly having a mirror casing and a reflective element adjustably supported within said mirror casing, said mirror casing having an inboard portion that faces generally toward the exterior side of the equipped vehicle, wherein said inboard portion of said mirror casing is viewable by a driver of the equipped vehicle when said exterior rearview mirror assembly is attached at the exterior side of the equipped vehicle, and wherein said inboard portion of said mirror casing is substantially not directly viewed by drivers of other vehicles when the other vehicles are overtaking the equipped vehicle from the rear of the equipped vehicle at a side lane adjacent to the side of the equipped vehicle at which said exterior rearview mirror assembly is mounted when the equipped vehicle is operated on a road;

a blind spot indicator at said inboard portion of said mirror casing, wherein said blind spot indicator comprises a unitary indicator module, wherein said unitary indicator module comprises an illumination source comprising at least one light emitting diode, wherein said illumination source is disposed behind an at least partially light transmitting element of said unitary indicator module;

wherein said unitary indicator module is responsive to a control signal to activate said illumination source to indicate to the driver of the equipped vehicle a detected presence of an object at least one of alongside the equipped vehicle and rearward of the equipped vehicle, and wherein said control signal is generated by an electronic blind spot monitoring system of the equipped vehicle;

wherein said unitary indicator module is substantially sealed so as to be substantially impervious to water;

wherein said at least partially light transmitting element is viewable by the driver of the equipped vehicle at said inboard portion of said mirror casing, and wherein said blind spot indicator comprises an icon that is indicative of the function of said blind spot indicator irrespective of actuation of said illumination source, and wherein light emitted by said illumination source passes through said at least partially light transmitting element for viewing by the driver of the equipped vehicle; and wherein said unitary indicator module is disposed at said inboard portion of said mirror casing so that light emitted by said illumination source passing through said at least partially light transmitting element is readily viewable by the driver of the equipped vehicle and wherein light emitted by said illumination source is generally not viewed by other road users when said exterior rearview mirror assembly is mounted at the side of the equipped vehicle and when the equipped vehicle is operated on a road.

2. The exterior rearview mirror system of claim 1, wherein said at least partially light transmitting element includes said icon.

3. The exterior rearview mirror system of claim 1, wherein said electronic blind spot monitoring system of the equipped vehicle comprises at least one of (a) an imaging sensor, (b) a radar sensor, (c) an ultrasonic sensor and (d) a sonar sensor.

4. The exterior rearview mirror system of claim 1, wherein said blind spot indicator comprises a light directing element for directing light emitted by said illumination source toward the side of the equipped vehicle at which said exterior rearview mirror assembly is mounted to enhance viewing of said blind spot indicator by the driver of the equipped vehicle when said illumination source is actuated.

5. The exterior rearview mirror system of claim 1, wherein said blind spot indicator includes a housing, and wherein said housing includes at least one attaching element for attaching said blind spot indicator at said inboard portion of said mirror casing.

6. The exterior rearview mirror system of claim 1, wherein said blind spot indicator is at least partially received within an aperture at said inboard portion of said mirror casing.

7. The exterior rearview mirror system of claim 6, wherein said blind spot indicator includes an attaching element for attaching to said exterior rearview mirror assembly when said blind spot indicator is at least partially received within said aperture at said inboard portion of said mirror casing.

8. The exterior rearview mirror system of claim 6, wherein said at least partially light transmitting element is one of (a) substantially flush with an outer surface of said inboard portion of said mirror casing when said blind spot indicator is at least partially received within said aperture at said inboard portion and (b) slightly to moderately proud of an outer surface of said inboard portion of said mirror casing when said blind spot indicator is at least partially received within said aperture at said inboard portion.

9. The exterior rearview mirror system of claim 8, wherein said at least partially light transmitting element comprises an optical lens.

10. The exterior rearview mirror system of claim 1, wherein said blind spot indicator comprises a multi-stage indicator for indicating a degree of hazard of the detected object.

11. The exterior rearview mirror system of claim 10, wherein said multi-stage indicator comprises multiple illumination sources selectively operable to indicate the degree of hazard detected.

12. The exterior rearview mirror system of claim 10, wherein said multi-stage indicator provides a first indication when no object is detected at the side lane adjacent to the equipped vehicle, a second indication when an object is detected that is approaching the side lane area, and a third indication when an object is detected that is occupying the side lane area.

13. The exterior rearview mirror system of claim 12, wherein said first, second and third indications provide at least one of (a) first, second and third color indications and (b) first, second and third indication modulations.

14. An exterior rearview mirror system for a vehicle, said exterior rearview mirror system comprising:

an exterior rearview mirror assembly configured for attaching to an exterior side of a vehicle equipped with said exterior rearview mirror system, said exterior rearview mirror assembly having a mirror casing and a reflective element adjustably supported within said mirror casing, said mirror casing having an inboard portion that faces generally toward the exterior side of the equipped vehicle, wherein said inboard portion of said mirror casing is viewable by a driver of the equipped vehicle when said exterior rearview mirror assembly is attached at the exterior side of the equipped vehicle, and wherein said inboard portion of said mirror casing is substantially not directly viewed by drivers of other vehicles when the other vehicles are overtaking the equipped vehicle from the rear of the equipped vehicle at a side lane adjacent to the side of the equipped vehicle at which said exterior rearview mirror assembly is mounted when the equipped vehicle is operated on a road;

a blind spot indicator at said inboard portion of said mirror casing, wherein said blind spot indicator comprises a unitary indicator module, wherein said unitary indicator module comprises an illumination source comprising at least one light emitting diode, wherein said illumination source is disposed behind an at least partially light transmitting element of said unitary indicator module, and wherein light emitted by said illumination source passes through said at least partially light transmitting element for viewing by the driver of the equipped vehicle;

wherein said unitary indicator module is responsive to a control signal to activate said illumination source to indicate to the driver of the equipped vehicle a detected presence of an object at least one of alongside the equipped vehicle and rearward of the equipped vehicle, and wherein said control signal is generated by an electronic blind spot monitoring system of the equipped vehicle;

wherein said unitary indicator module is substantially sealed so as to be substantially impervious to water;

wherein said unitary indicator module is disposed at said inboard portion of said mirror casing so that light emitted by said illumination source passing through said at least partially light transmitting element is readily viewable by the driver of the equipped vehicle and wherein light emitted by said illumination source is generally not viewed by other road users when said exterior rearview mirror assembly is mounted at the side of the equipped vehicle and when the equipped vehicle is operated on a road; and wherein said unitary indicator module comprises a light directing element for directing light emitted by said illumination source toward the side of the equipped vehicle at which said exterior rearview mirror assembly is mounted to enhance viewing of said blind spot indicator by the driver of the equipped vehicle when said illumination source is actuated.

15. The exterior rearview mirror system of claim 14, wherein said electronic blind spot monitoring system of the equipped vehicle comprises at least one of (a) an imaging sensor, (b) a radar sensor, (c) an ultrasonic sensor and (d) a sonar sensor.

16. The exterior rearview mirror system of claim 14, wherein said blind spot indicator is at least partially received within an aperture at said inboard portion of said mirror casing.

17. The exterior rearview mirror system of claim 16, wherein said blind spot indicator includes an attaching element for attaching to said exterior rearview mirror assembly when said blind spot indicator is at least partially received within said aperture at said inboard portion of said mirror casing.

18. The exterior rearview mirror system of claim 16, wherein said at least partially light transmitting element is one of (a) substantially flush with an outer surface of said inboard portion of said mirror casing when said blind spot indicator is at least partially received within said aperture at said inboard portion and (b) slightly to moderately proud of an outer surface of said inboard portion of said mirror casing when said blind spot indicator is at least partially received within said aperture at said inboard portion.

19. The exterior rearview mirror system of claim 14, wherein said blind spot indicator comprises a multi-stage indicator for indicating a degree of hazard of the detected object, and wherein said multi-stage indicator comprises multiple illumination sources selectively operable to indicate the degree of hazard detected, and wherein said multi-stage indicator provides a first indication when no object is detected at the side lane adjacent to the equipped vehicle, a second indication when an object is detected that is approaching the side lane area, and a third indication when an object is detected that is occupying the side lane area.

20. An exterior rearview mirror system for a vehicle, said exterior rearview mirror system comprising:

an exterior rearview mirror assembly configured for attaching to an exterior side of a vehicle equipped with said exterior rearview mirror system, said exterior rearview mirror assembly having a mirror casing and a reflective element adjustably supported within said mirror casing, said mirror casing having an inboard portion that faces generally toward the exterior side of the equipped vehicle, wherein said inboard portion of said mirror casing is viewable by a driver of the equipped vehicle when said exterior rearview mirror assembly is attached at the exterior side of the equipped vehicle, and wherein said inboard portion of said mirror casing is substantially not directly viewed by drivers of other vehicles when the other vehicles are overtaking the equipped vehicle from the rear of the equipped vehicle at a side lane adjacent to the side of the equipped vehicle at which said exterior rearview mirror assembly is mounted when the equipped vehicle is operated on a road;

a blind spot indicator at said inboard portion of said mirror casing, wherein said blind spot indicator comprises a unitary indicator module, and wherein said unitary indicator module comprises an illumination source comprising at least one light emitting diode, and wherein said illumination source is disposed behind an at least partially light transmitting element of said unitary indicator module, and wherein light emitted by said illumination source passes through said at least partially light transmitting element for viewing by the driver of the equipped vehicle;

wherein said unitary indicator module is responsive to a control signal to activate said illumination source to indicate to the driver of the equipped vehicle a detected presence of an object at least one of alongside the equipped vehicle and rearward of the equipped vehicle, and wherein said control signal is generated by an electronic blind spot monitoring system of the equipped vehicle;

wherein said unitary indicator module is substantially sealed so as to be substantially impervious to water;

wherein said blind spot indicator is disposed at said inboard portion of said mirror casing so that light emitted by said illumination source passing through said at least partially light transmitting element is readily viewable by the driver of the equipped vehicle and wherein light emitted by said illumination source is generally not viewed by other road users when said exterior rearview mirror assembly is mounted at the side of the equipped vehicle and when the equipped vehicle is operated on a road; and wherein said unitary indicator module includes a housing and an optic element.

21. The exterior rearview mirror system of claim 20, wherein said electronic blind spot monitoring system of the equipped vehicle comprises at least one of (a) an imaging sensor, (b) a radar sensor, (c) an ultrasonic sensor and (d) a sonar sensor.

22. The exterior rearview mirror system of claim 20, wherein said housing includes at least one attaching element for attaching said unitary indicator module at said inboard portion of said mirror casing.

23. The exterior rearview mirror system of claim 20, wherein said blind spot indicator is at least partially received within said inboard portion of said mirror casing.

24. The exterior rearview mirror system of claim 23, wherein said at least partially light transmitting element is one of (a) substantially flush with an outer surface of said inboard portion of said mirror casing when said blind spot indicator is at least partially received within said inboard portion and (b) slightly to moderately proud of an outer surface of said inboard portion of said mirror casing when said blind spot indicator is at least partially received within said inboard portion.

25. The exterior rearview mirror system of claim 20, wherein said blind spot indicator comprises a multi-stage indicator for indicating a degree of hazard of the detected object, and wherein said multi-stage indicator comprises multiple illumination sources selectively operable to indicate the degree of hazard detected, and wherein said multi-stage indicator provides a first indication when no object is detected at the side lane adjacent to the equipped vehicle, a second indication when an object is detected that is approaching the side lane area, and a third indication when an object is detected that is occupying the side lane area.

26. An exterior rearview mirror system for a vehicle, said exterior rearview mirror system comprising:

an exterior rearview mirror assembly configured for attaching to an exterior side of a vehicle equipped with said exterior rearview mirror system, said exterior rearview mirror assembly having a mirror casing and a reflective element adjustably supported within said mirror casing, said mirror casing having an inboard portion that faces generally toward the exterior side of the equipped vehicle, wherein said inboard portion of said mirror casing is viewable by a driver of the equipped vehicle when said exterior rearview mirror assembly is attached at the exterior side of the equipped vehicle, and wherein said inboard portion of said mirror casing is substantially not directly viewed by drivers of other vehicles when the other vehicles are overtaking the equipped vehicle from the rear of the equipped vehicle at a side lane adjacent to the side of the equipped vehicle at which said exterior rearview mirror assembly is mounted when the equipped vehicle is operated on a road;

a blind spot indicator at said inboard portion of said mirror casing, wherein said blind spot indicator comprises an illumination source comprising at least one light emitting diode, and wherein said illumination source is disposed behind an at least partially light transmitting element, and wherein light emitted by said illumination source passes through said at least partially light transmitting element for viewing by the driver of the equipped vehicle;

wherein said blind spot indicator is disposed at said inboard portion of said mirror casing so that light emitted by said illumination source passing through said at least partially light transmitting element is readily viewable by the driver of the equipped vehicle and wherein light emitted by said illumination source is generally not viewed by other road users when said exterior rearview mirror assembly is mounted at the side of the equipped vehicle and when the equipped vehicle is operated on a road;

wherein said blind spot indicator is at least partially received within said mirror casing; and wherein said at least partially light transmitting element is one of (a) substantially flush with an outer surface of said inboard portion of said mirror casing when said blind spot indicator is at least partially received within said aperture at said inboard portion and (b) slightly to moderately proud of an outer surface of said inboard portion of said mirror casing when said blind spot indicator is at least partially received within said aperture at said inboard portion.

27. The exterior rearview mirror system of claim 26, wherein said blind spot indicator includes an attaching element for attaching to said exterior rearview mirror assembly when said blind spot indicator is at least partially received within said inboard portion of said mirror casing.

28. The exterior rearview mirror system of claim 26, wherein said blind spot indicator comprises a unitary indicator module, said unitary indicator module being responsive to a control signal to activate said illumination source to indicate to the driver of the equipped vehicle a detected presence of an object at least one of alongside the equipped vehicle and rearward of the equipped vehicle, said unitary indicator module being substantially sealed so as to be substantially impervious to water.

29. The exterior rearview mirror system of claim 28, wherein said control signal is generated by an electronic blind spot monitoring system of the equipped vehicle.

30. The exterior rearview mirror system of claim 29, wherein said electronic blind spot monitoring system of the equipped vehicle comprises at least one of (a) an imaging sensor, (b) a radar sensor, (c) an ultrasonic sensor and (d) a sonar sensor.

31. The exterior rearview mirror system of claim 26, wherein said blind spot indicator comprises a multi-stage indicator for indicating a degree of hazard of the detected object, and wherein said multi-stage indicator comprises multiple illumination sources selectively operable to indicate the degree of hazard detected, and wherein said multi-stage indicator provides a first indication when no object is detected at the side lane adjacent to the equipped vehicle, a second indication when an object is detected that is approaching the side lane area, and a third indication when an object is detected that is occupying the side lane area, and wherein said first, second and third indications provide at least one of (a) first, second and third color indications and (b) first, second and third indication modulations.

* * * * *